United States Patent
Toda et al.

(10) Patent No.: US 7,133,565 B2
(45) Date of Patent: Nov. 7, 2006

(54) IMAGE PROCESSING APPARATUS AND METHOD

(75) Inventors: Yukari Toda, Kanagawa (JP); Tetsuomi Tanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 954 days.

(21) Appl. No.: 09/931,890

(22) Filed: Aug. 20, 2001

(65) Prior Publication Data

US 2002/0037100 A1   Mar. 28, 2002

(30) Foreign Application Priority Data

| Aug. 25, 2000 | (JP) | ............................ 2000-256131 |
| Aug. 25, 2000 | (JP) | ............................ 2000-256133 |
| Jul. 3, 2001 | (JP) | ............................ 2001-202450 |
| Jul. 3, 2001 | (JP) | ............................ 2001-202451 |

(51) Int. Cl.
   *G06K 9/36*    (2006.01)

(52) U.S. Cl. ........................... 382/243; 382/176

(58) Field of Classification Search ................ 382/168, 382/173, 176, 164, 171, 243, 233; 707/203, 707/1; 345/716; 348/384.1

See application file for complete search history.

(56) References Cited

U.S. PATENT DOCUMENTS

| 4,922,349 A | | 5/1990 | Abe et al. .................... 358/443 |
| 5,270,805 A | | 12/1993 | Abe et al. ..................... 358/50 |
| 5,361,147 A | | 11/1994 | Katayama et al. .......... 358/532 |
| 5,668,646 A | | 9/1997 | Katayama et al. .......... 358/530 |
| 5,703,967 A | | 12/1997 | Takaoka ..................... 382/239 |
| 5,818,970 A | | 10/1998 | Ishikawa et al. ............ 382/248 |
| 5,848,185 A | | 12/1998 | Koga et al. ................. 382/173 |
| 5,897,642 A | * | 4/1999 | Capossela et al. .......... 707/203 |
| 5,903,671 A | | 5/1999 | Toda ........................... 382/236 |
| 5,909,505 A | | 6/1999 | Katayama et al. .......... 382/164 |
| 5,933,249 A | | 8/1999 | Shimura et al. ............. 358/429 |
| 5,937,099 A | | 8/1999 | Takaoka ..................... 382/239 |
| 5,949,555 A | * | 9/1999 | Sakai et al. ................. 358/462 |
| 6,173,088 B1 | * | 1/2001 | Koh et al. .................... 382/289 |
| 6,272,255 B1 | | 8/2001 | de Queiroz et al. ........ 382/239 |
| 6,282,314 B1 | | 8/2001 | Sugiura et al. ............. 382/173 |
| 6,556,711 B1 | | 4/2003 | Koga et al. ................. 382/173 |
| 6,628,833 B1 | * | 9/2003 | Horie .......................... 382/173 |
| 6,798,906 B1 | * | 9/2004 | Kato ........................... 382/176 |

FOREIGN PATENT DOCUMENTS

JP      3-104380        5/1991

OTHER PUBLICATIONS

Tompkins et al., "A Fast Segmentation Algorithm for Bi–Level Image Compression Using JBIG2", IEEE vol. 1, 1999, pp. 224–228.*

* cited by examiner

*Primary Examiner*—Anh Hong Do
(74) *Attorney, Agent, or Firm*—Fitzpatrick, Cella, Harper & Scinto

(57) ABSTRACT

This invention has as its object to provide an image processing apparatus and method which can efficiently compress an image while maintaining high image quality, and a storage medium for implementing the method. To accomplish this, an apparatus has a text area detector (101) for extracting a text area from multi-valued image data, and generating text area coordinate data (109) as position data of the text area, a binarization unit (102) for generating binary image data (108) by binarizing multi-valued image data of the text area, a color computation unit (103) for generating text color data (110) by computing a representative color of the text area, a text paint unit (104) for generating non-text multi-valued image data A by converting multi-valued image data of the text area using multi-valued image data of an area other than text, a reduction unit (105) for generating reduced non-text multi-valued image data by lowering the resolution of the non-text multi-valued image data, a JPEG compression unit (106) for compressing the non-text multi-valued image data by JPEG, and an MMR compression unit for compressing the binary image data of the text area by MMR.

24 Claims, 39 Drawing Sheets

ORIGINAL IMAGE

LUMINANCE HISTOGRAM

BINARY IMAGE K

FIG. 10A
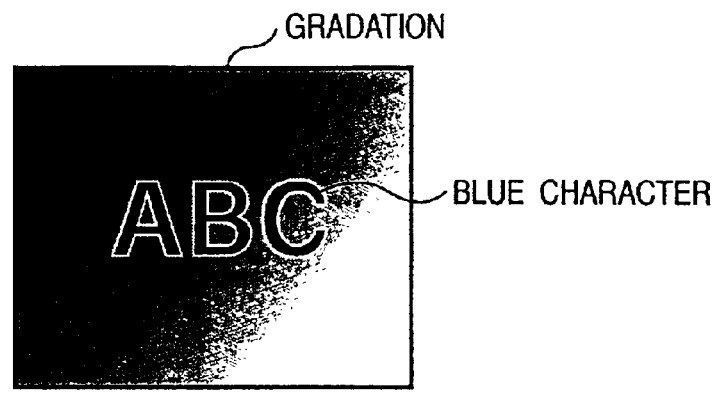
FIG. 10B
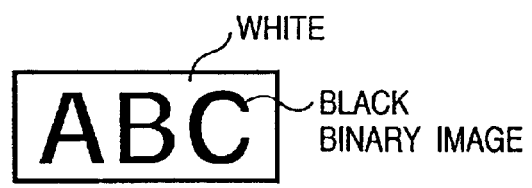
FIG. 10C

REPRESENTATIVE
COLOR DATA
R=20,G=30,B=225

— BLUE OF (20,30,225)

FIG. 18A

| −1 | −1 | −1 | −1 | −1 |
|---|---|---|---|---|
| −1 | −1 | −1 | −1 | −1 |
|   |   | * |   |   |
| +1 | +1 | +1 | +1 | +1 |
| +1 | +1 | +1 | +1 | +1 |

| −1 | −1 |   | +1 | +1 |
|---|---|---|---|---|
| −1 | −1 |   | +1 | +1 |
| −1 | −1 | * | +1 | +1 |
| −1 | −1 |   | +1 | +1 |
| −1 | −1 |   | +1 | +1 |

FIG. 18B

| −1 | −1 | −1 |
|---|---|---|
| −1 | 8 | −1 |
| −1 | −1 | −1 |

F I G. 30E
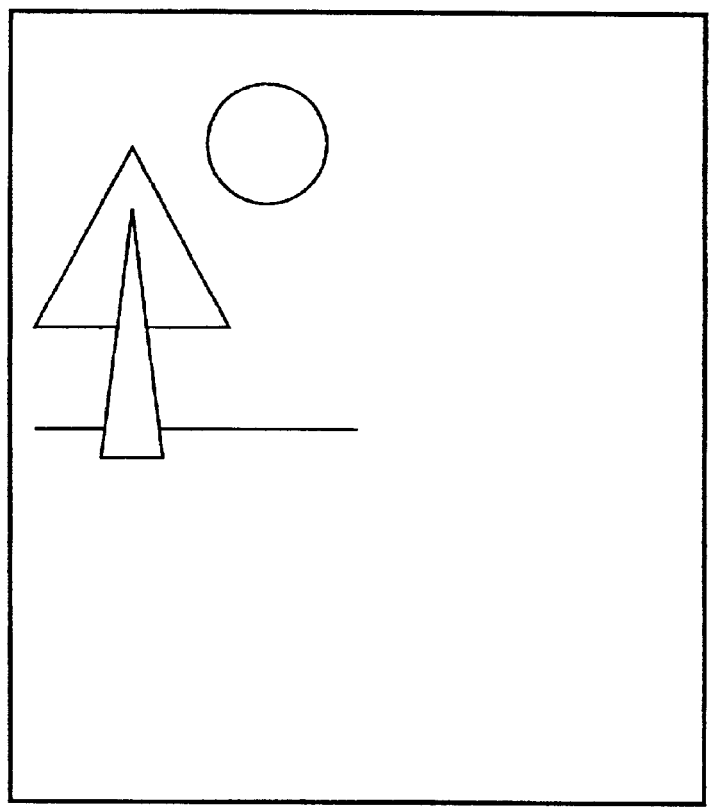

F I G. 34

|  | TEXT2 |
|---|---|
| TEXT1 | 0 |
| TEXT2 | 999 |
| TEXT3 | 0 |
| TEXT4 | 1 |
| TEXT5 | 0 |

IMAGE PROCESSING APPARATUS AND METHOD

FIELD OF THE INVENTION

The present invention relates to an image processing apparatus and method, and a storage medium for implementing this method.

BACKGROUND OF THE INVENTION

In recent years, digital documentation has advanced along with the prevalence of scanners. In order to store a digital document in a full-color bitmap format, for example, an A4-size document amounts to about 24 Mbytes at 300 dpi, and a huge memory size is required. Such large-size data is not suitable for sending it as an attachment file of an e-mail message. To solve this problem, it is a common practice to compress a full-color image, and JPEG is known as a compression method for such purpose. JPEG is very effective to compress a natural image such as a photo or the like, and can assure high image quality. However, when a high-frequency portion such as a text portion is compressed by JPEG, image deterioration called mosquito noise is generated, and the compression ratio is low. Hence, the image is broken up into some areas to generate JPEG-compressed data of a background portion except for a text area, and MMR-compressed data of a text area portion with color information. Upon decompression, the individual data are decompressed and combined to express an original image.

However, a compression ratio that can be realized by the aforementioned method while maintaining high image quality is not high enough. Also, information of characters emphasized in red in black character text is lost. That is, when an image containing a text portion using two or more colors is compressed by the above compression method and the compressed image is expanded, the number of colors of the text portion contained in the expanded image is reduced to one.

SUMMARY OF THE INVENTION

The present invention has been made to solve the conventional problems, and has as its object to provide an image processing apparatus and method which can efficiently compress an image while maintaining high image quality, and a storage medium for implementing the method.

According to present invention, the foregoing object is attained by providing an image processing apparatus comprising: extraction means for extracting a text area from multi-valued image data, and generating position data of the text area; color computation means for generating representative color data of a text portion in the text area; generation means for generating text image data expressed by the representative color in the text area; conversion means for generating non-text multi-valued image data by converting multi-valued image data of the text portion using multi-valued image data of a portion other than the text portion; first compression means for compressing the non-text multi-valued image data; and second compression means for compressing the text image data, wherein the color computation means generates one representative color data for each text area, and the generation means comprises means for binarizing the multi-valued image data in the text area.

According to another aspect of the present invention, the foregoing object is attained by providing an image processing apparatus comprising: extraction means for extracting a text area from multi-valued image data, and generating position data of the text area; color computation means for generating representative color data of a text portion in the text area; generation means for generating text image data expressed by the representative color in the text area; conversion means for generating non-text multi-valued image data by converting multi-valued image data of the text portion using multi-valued image data of a portion other than the text portion; first compression means for compressing the non-text multi-valued image data; second compression means for compressing the text image data; and resolution conversion means for generating reduced non-text multi-valued image data by lowering a resolution of the non-text multi-valued image data, and wherein the first compression means compresses the reduced non-text multi-valued image data.

In still another aspect of the present invention, the foregoing object is attained by providing an image processing apparatus comprising: extraction means for extracting a text area from multi-valued image data, and generating position data of the text area; color computation means for generating representative color data of a text portion in the text area; generation means for generating text image data expressed by the representative color in the text area; conversion means for generating non-text multi-valued image data by converting multi-valued image data of the text portion using multi-valued image data of a portion other than the text portion; first compression means for compressing the non-text multi-valued image data; and second compression means for compressing the text image data wherein the color computation means includes: color palette generation means for generating at least one color palette as the representative color data by executing a color reduction process of a text image in the text area, and the generation means includes: color-reduced image generation means for generating color-reduced image data corresponding to the color palette.

In still another aspect of the present invention, the foregoing object is attained by providing An image processing apparatus comprising: extraction means for extracting a text area from multi-valued image data, and generating position data of the text area; color computation means for generating representative color data of a text portion in the text area; generation means for generating text image data expressed by the representative color in the text area; conversion means for generating non-text multi-valued image data by converting multi-valued image data of the text portion using multi-valued image data of a portion other than the text portion; first compression means for compressing the non-text multi-valued image data; and second compression means for compressing the text image data, wherein the generation means includes binarization means for applying a differential filter to the multi-valued image data, computing edge amounts of pixels that form the multi-valued image with neighboring pixels, and binarizing the data on the basis of the edge amounts.

In still another aspect of the present invention, the foregoing object is attained by providing an image processing apparatus comprising: extraction means for extracting a text area from multi-valued image data, and generating position data of the text area; color computation means for generating representative color data of a text portion in the text area; generation means for generating text image data expressed by the representative color in the text area; conversion means for generating non-text multi-valued image data by converting multi-valued image data of the text portion using multi-valued image data of a portion other than the text portion; first compression means for compressing the non-text multi-valued image data; and second compression means for compressing the text image data, wherein the conversion means comprises: segmentation means for segmenting the multi-valued image into blocks each having a predetermined size; and discrimination means for discriminating if each of the blocks segmented by the segmentation means includes a text portion, and when the discrimination means discriminates that the block of interest includes a text portion, an average value of colors of a portion other than the text portion in the block of interest is computed, and the multi-value image data of the text portion is converted using the computed average color value.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 10A, 10B, and 10C are views for explaining a text portion paint process according to the first embodiment of the present invention;

FIGS. 18A and 18B show an example of differential filters in the modification of the first embodiment;

FIGS. 30A to 30E are views for explaining an inclusion process of the image processing apparatus according to the fifth embodiment of the present invention;

FIG. 34 shows a coupling list used in the processing of the image coupling unit 2905 of the image processing apparatus according to the seventh embodiment of the present invention.

DETAILED DESCRIPTION OF THE PREFERRED EMBODIMENTS

Preferred embodiments of the present invention will be explained in detail hereinafter with reference to the accompanying drawings. Note that the relative layout of building components, equations, numerical values, and the like described in the embodiments do not limit the scope of the present invention to themselves unless otherwise specified.
(First Embodiment)

An image processing apparatus according to the first embodiment of the present invention will be described below.

Figure 1:
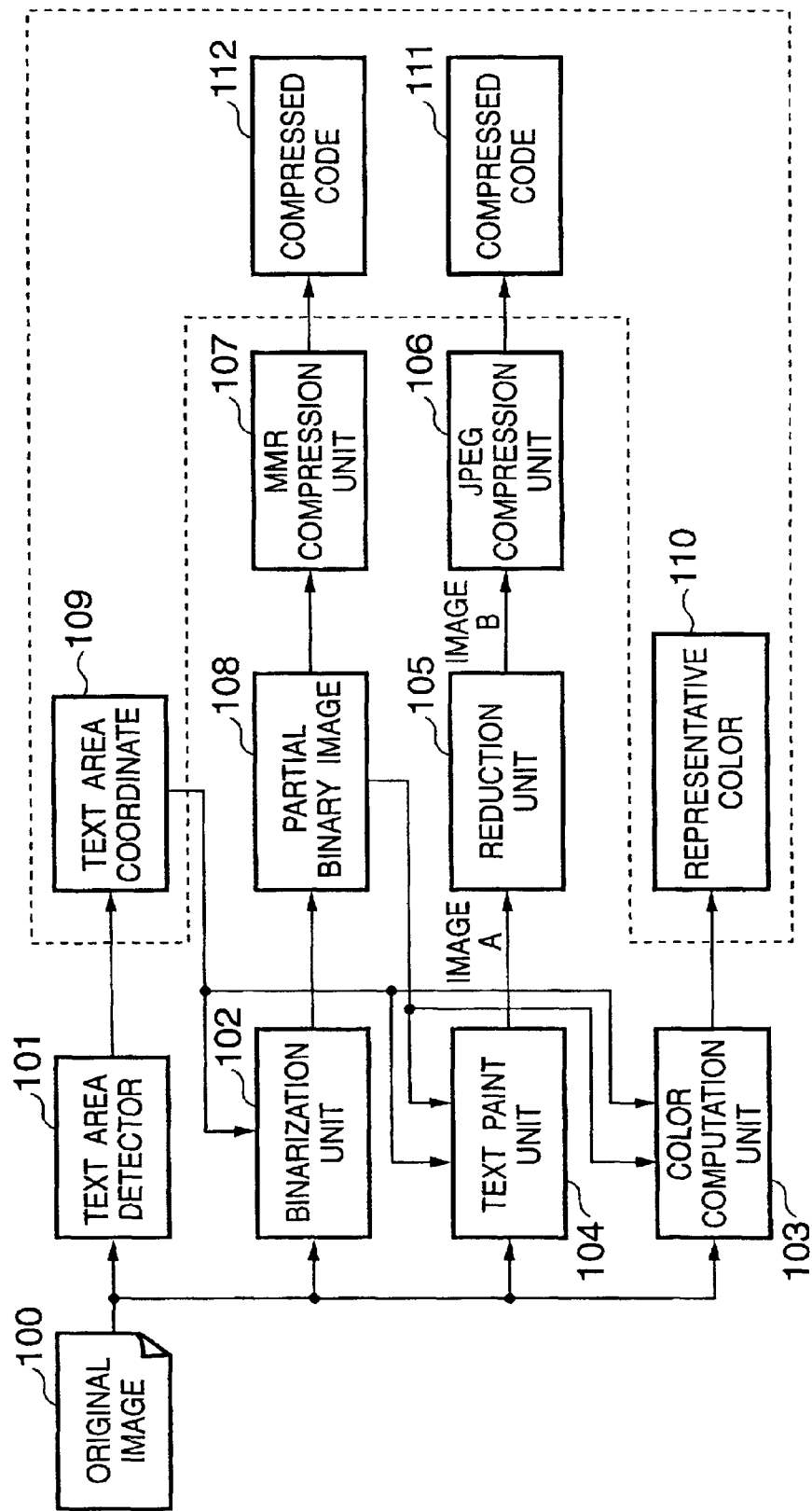
FIG. 1 is a block diagram of a compression apparatus according to the first embodiment of the present invention.

FIG. 1 is a block diagram showing the arrangement of an image processing apparatus of this embodiment.

Reference numeral 101 denotes a text area detector for detecting text areas from an input original image 100 (color multi-valued image or grayscale image), and generating coordinate data 109 of a plurality of text areas. Reference numeral 102 denotes a binarization unit for receiving the text area coordinate data, and generating partial binary images 108 of the text areas of the original image 100. Reference numeral 103 denotes a color computation unit for computing a representative color 110 of a black portion with reference to the black portion of the binary images and the original image 100. Reference numeral 104 denotes a text paint unit for extracting the areas of the binary images (black) from the original image 100, and painting them in surrounding color to generate image A. Reference numeral 105 denotes a reduction unit for receiving image A, and generating image B by reducing image A. Reference numeral 106 denotes a JPEG compression unit for receiving image B, compressing image B by JPEG, and generating a compressed code 111. Reference numeral 107 denotes an MMR compression unit for receiving the plurality of binary images, compressing them by MMR, and generating a plurality of compressed codes 112. Finally, data 109 to 112 bounded by the broken line are coupled to obtain compressed data.

That is, as the image compression flow of the image processing apparatus of this embodiment, text area coordinate data 109 are extracted from the entire multi-valued image, the extracted text areas are respectively binarized to obtain partial binary images 108, and the partial binary images 108 are compressed by MMR to generate compressed codes 112. On the other hand, the portions of the partial binary images 108 in the entire multi-valued image are filled by multi-valued images to generate image A, which is reduced and compressed by JPEG, thus generating a compressed code 111. Furthermore, the color computation unit 103 obtains representative colors 110 of text portions for respective text areas.

<Text Area Detection Process>

Figure 3:
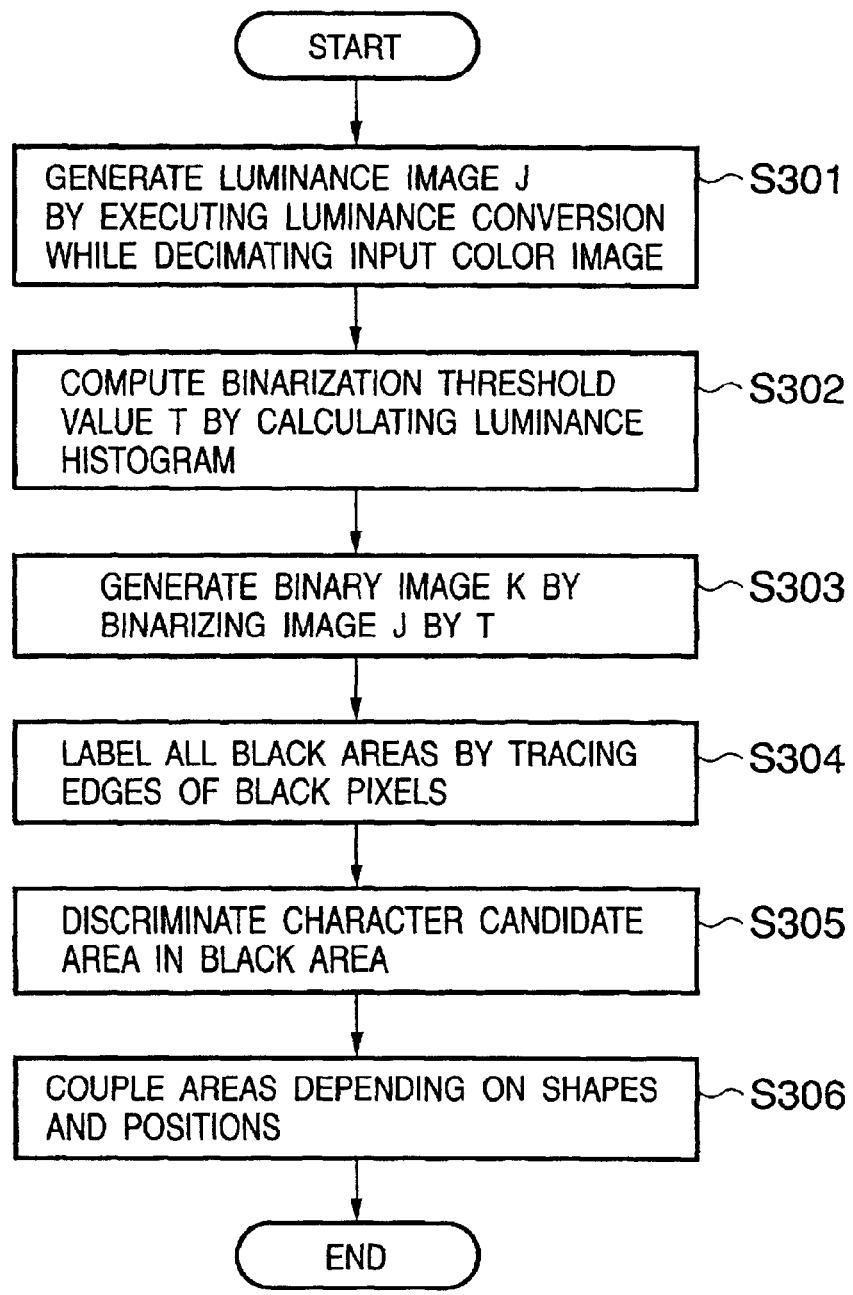
FIG. 3 is a flow chart showing the processing of a text area detector according to the first embodiment of the present invention.

Detailed contents of the text area detection process will be explained below using FIGS. 3 to 8. FIG. 3 is a flow chart for explaining the processing in the text area detector 101. Note that the program code according to this flow chart is stored in a memory such as a ROM, RAM, or the like (not shown) in the image processing apparatus of this embodiment, and is read out and executed by a CPU (not shown).

In step S301, an original image 100 is input, and undergoes luminance conversion while being decimated to lower its resolution, thus generating image J of luminance Y. For example, if the original image 100 is expressed by R, G, and B 24-bit data and has a resolution of 300 dpi:

$$Y=0.299R+0.587G+0.114B$$

is computed every four pixels in both the vertical and horizontal directions to generate new image J. Luminance Y of new image J is expressed by 8 bits, and the resolution is 75 dpi. In step S302, the histogram of the luminance data is computed to obtain binarization threshold value T. In step S303, image J is binarized by threshold value T to generate binary image K. Furthermore, in step S304 the edges of black pixels are traced to label all black areas. In step S305, a character candidate area in each black area is discriminated. In step S306, areas to be coupled are coupled based on their patterns and positions.

Figure 4:
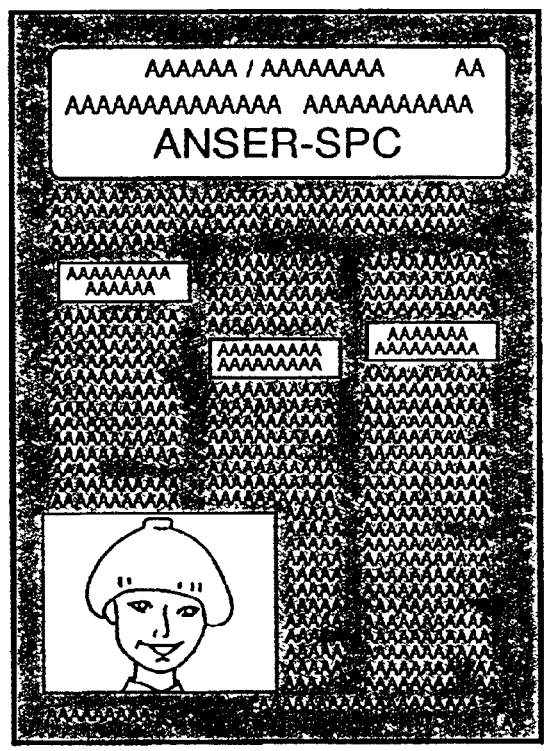
FIG. 4 shows an original image to explain a text area detection process according to the first embodiment of the present invention.
Figure 5:
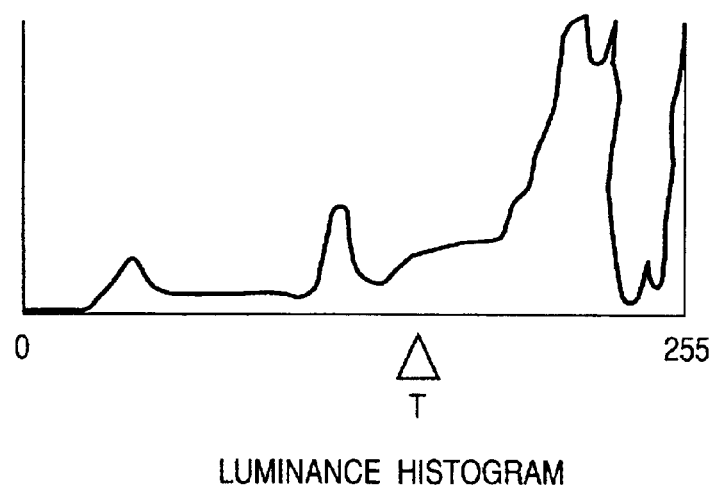
FIG. 5 shows a histogram to explain the text area detection process according to the first embodiment of the present invention.
Figure 6:
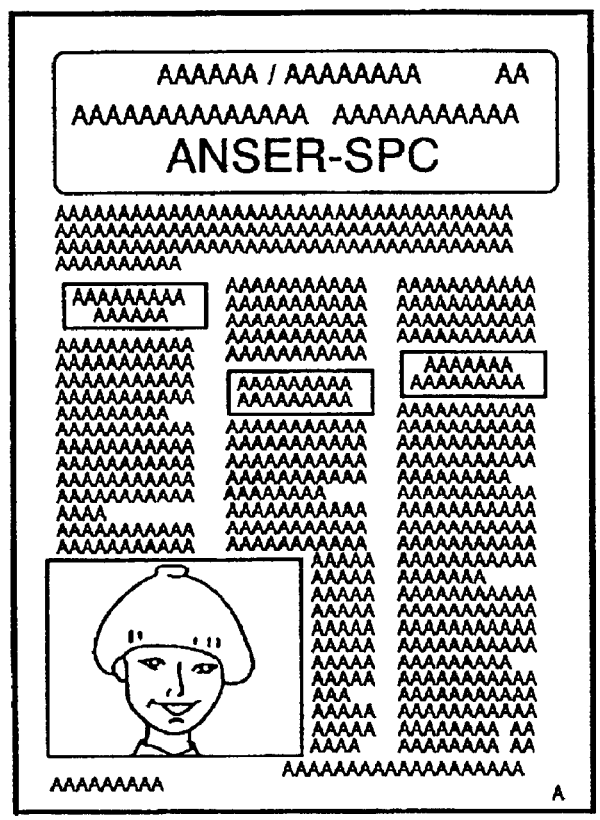
FIG. 6 shows an example of a binary image to explain the text area detection process according to the first embodiment of the present invention.
Figure 7:
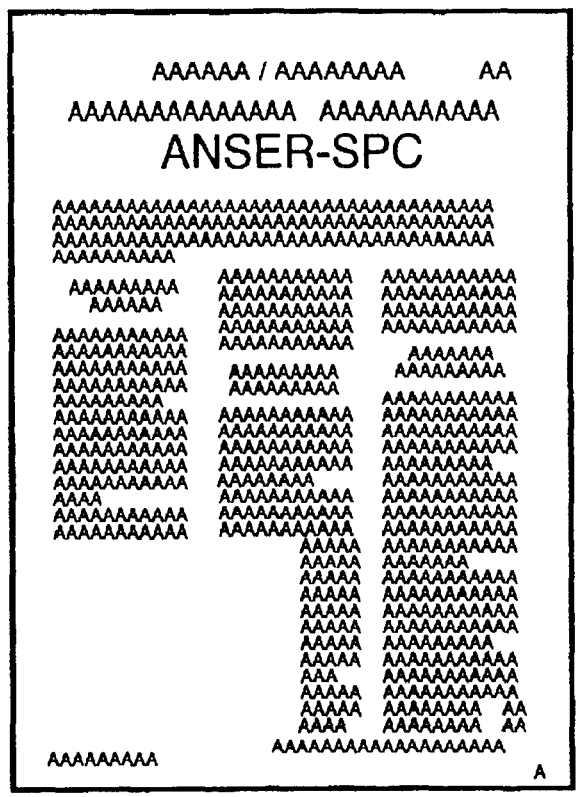
FIG. 7 shows an example of a text area image to explain the text area detection process according to the first embodiment of the present invention.

For example, when an original image shown in FIG. 4 is input, the histogram of this image after decimation and luminance conversion is computed, as shown in FIG. 5. Threshold value T=150 is computed from this histogram using data such as an average, variance, and the like, and an image binarized using this threshold value is as shown in FIG. 6. When the edges of black pixels in FIG. 6 are traced to label all areas, and only sets of black pixels each having a width or height equal to or smaller than the threshold value are determined to be characters, the sets of black pixels shown in FIG. 7 form text areas (FIG. 7 shows a concept for the purpose of description, but such image is not generated in practice).

Figure 8:
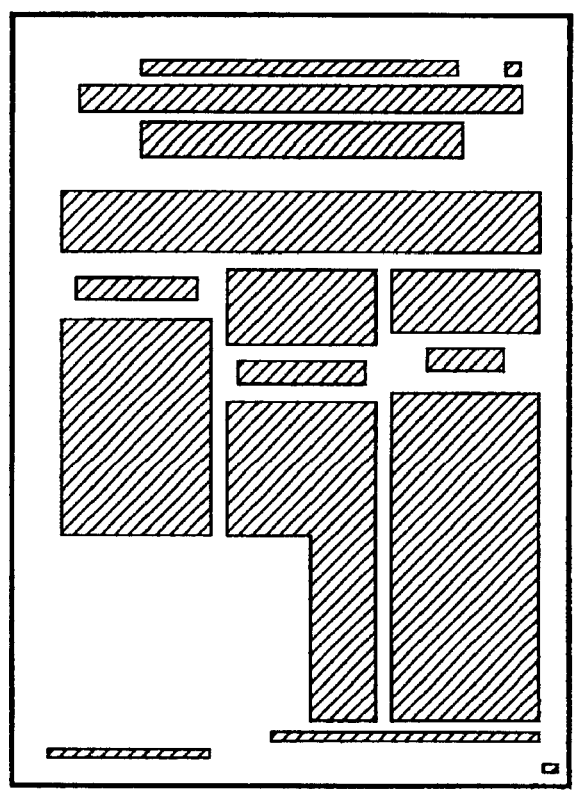
FIG. 8 shows an example of a text area portion to explain the text area detection process according to the first embodiment of the present invention.

When these sets of black pixels are grouped based on near positions, and matches of widths and heights, 17 text areas can be detected, as shown in FIG. 8. The coordinate data of these areas are stored in a RAM (not shown) as text area coordinate data 109 shown in FIG. 1.

In place of binarizing the original image 100, the image 100 may be filtered by a differential filter to compute edge amounts of all pixels with neighboring pixels, and a binary image obtained by binarizing these edge amounts may undergo edge trace to detect text areas.

<Text Portion Compression Process>

Figure 9:
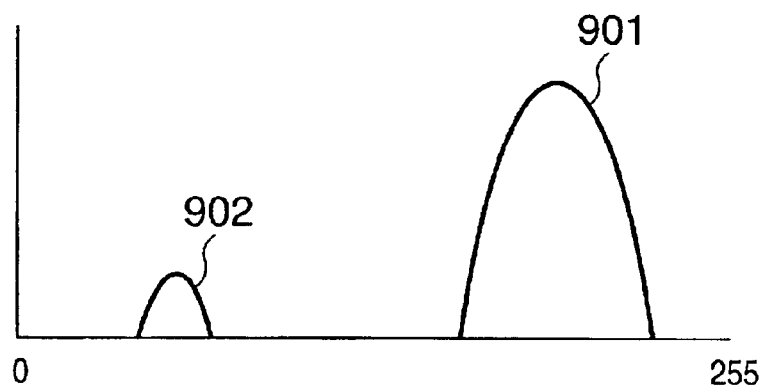
FIG. 9 shows an example of the histogram result of a text area input to a binarization unit 109 according to the first embodiment of the present invention.

In order to compress text portions, the binarization unit 102 generates partial binary images 108 of the 17 text areas obtained by the aforementioned method. Such binary image may be generated by binarizing the text area using T computed by the text area detector 101, or the histogram of each area may be computed to obtain an optimal binarization threshold value for that text area. Since the luminance histogram of each text area is expected to have a simple pattern shown in FIG. 9 compared to the histogram of the entire image shown in FIG. 5, it is easy to determine a threshold value. Reference numeral 901 denotes a set of background colors; and 902, a set of text colors.

The binary image data of the text portions obtained by binarizing the respective text areas are input to the MMR compression unit 107, are compressed by MMR, and are stored as a plurality of compressed codes 112 in a memory.

<Text Color Computation Process>

Figure 12:
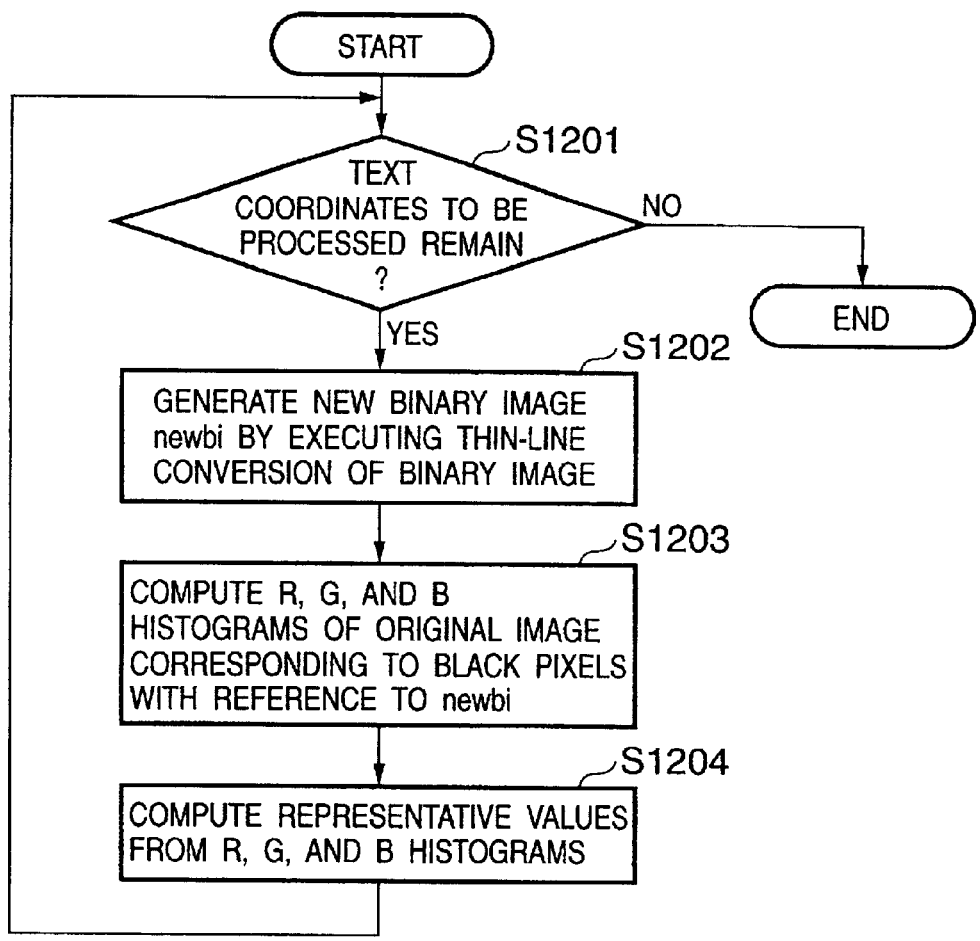
FIG. 12 is a flow chart for explaining the processing of a color computation unit according to the first embodiment of the present invention.

The text color computation process is done for each of all the extracted text areas. FIG. 12 shows an example of the text color computation unit using the binarization results.

It is checked in step S1201 if character area coordinate data to be processed still remain. If YES in step S1201, the flow advances to step S1202; otherwise, the flow advances to "end". In step S1202, a binary image in the text area addressed by that coordinate data undergoes thin-line conversion. That is, black pixels corresponding to change portions from the background to character portions upon scanning by a scanner are reduced to generate a new binary image "newbi". In step S1203, the R, G, and B histograms of the original image 100 corresponding to black pixels of "newbi" are computed (of course, other color spaces such as YUV and the like may be used). In step S1204, R, G, and B representative values are computed.

The method of computing the representative values includes the following representative value extraction method in addition to a method of simply selecting a density having a maximum frequency of occurrence in the histogram as a representative value.

That is, in that method, a coarse histogram with a fewer number of steps is generated to obtain a density range including a maximum frequency of occurrence, and a density value having a maximum frequency of occurrence within that density range is selected as a representative value with reference to a fine histogram. This method will be explained in detail below with reference to the drawings.

Figure 13:
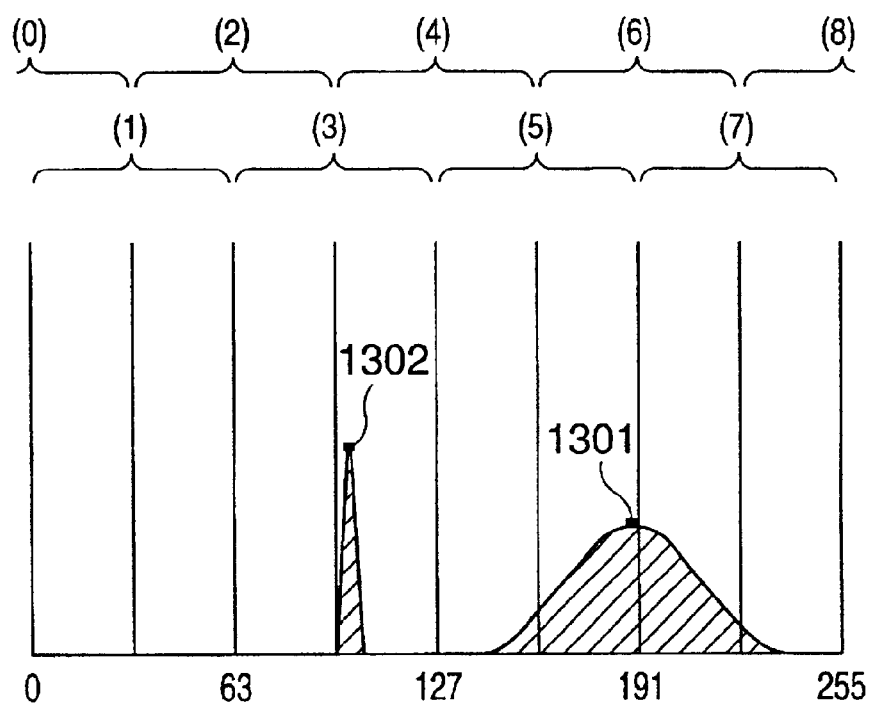
FIG. 13 is a view for explaining an example of a representative value computation process of the color computation unit according to the first embodiment of the present invention.

Assume that the pixel densities of the original image 100 at a position corresponding to a binary image "newbi" in a given text area are expressed by a 256-step histogram, and an R histogram shown in FIG. 13 is obtained. Simply calculated, the density value of the maximum frequency of occurrence in this histogram is 1302. However, most pixels which form this character gather around 1301, and fall within the range from 150 to 230 as the R density. Therefore, a value 1301 is appropriate as a representative value.

In order to extract the value 1301 as the representative value, the total density range from 0 to 255 of the histogram is divided into nine overlapping ranges each having a 32-density width. In this example, the density range is divided into nine density ranges (0): 0 to 31, (1): 0 to 63, (2): 32 to 95, (3): 64 to 127, (4): 96 to 159, (5): 128 to 191, (6): 160 to 223, (7): 192 to 255, and (8): 224 to 255. Although each of ranges (1) to (7) has a 64-density width, each of ranges (0) and (8) has a 32-density width, and the number of pixels belonging to these ranges is doubled upon comparison.

When a coarse histogram is generated by counting the numbers of pixels belonging to these density ranges, the number of pixels that belong to range (6) is largest in FIG. 13. Hence, the maximum value of range (6) is searched using a fine histogram to obtain 1301. The aforementioned process is repeated for all text areas, thus computing one representative color for each of all text areas.

<Background Image Compression Process>

Upon compressing a background image, a text portion paint process is done to extract an image that does not contain any text from the original image 100.

Figure 11:
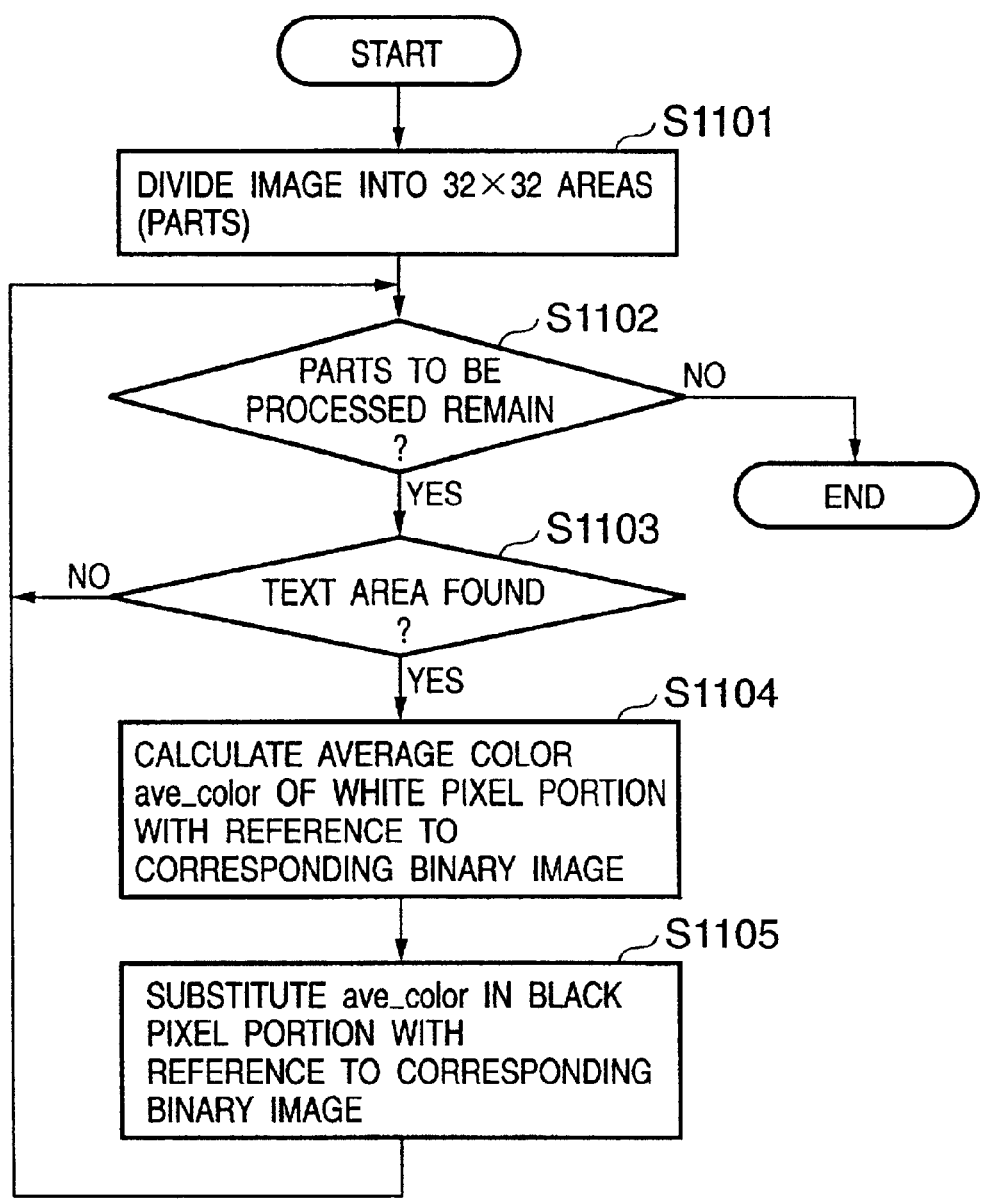
FIG. 11 is a flow chart for explaining the text portion paint process according to the first embodiment of the present invention.

An example of the processing of the text paint unit 104 using the binarization results will be explained below using FIGS. 10A to 10C and FIG. 11. FIGS. 10A to 10C show an example of images to explain the text portion paint process, and FIG. 11 is a flow chart showing the flow of the text portion paint process. The program code according to the flow chart shown in FIG. 11 is stored in a memory such as a ROM, RAM, or the like (not shown) in the image processing apparatus of this embodiment, and is read out and executed by a CPU (not shown).

Assume that the original image 100 of a text area is an image which has a gradation image as a background and on which blue letters "ABC" are drawn near the center, as shown in FIG. 10A. Also, a binary image shown in FIG. 10B is obtained from this original image 100. In this embodiment, the image is broken up into 32×32 areas (to be referred to as parts hereinafter), and processing is done for respective parts. FIG. 10C shows the image broken up into parts. FIG. 10C illustrates a state wherein the image is broken up into 5×4 parts for the sake of simplicity. The upper left numeral of each part indicates a part number.

When the image is broken up in this way, since it is determined in step S1103 that parts 00 to 04, 10, 14, 20, 24, and 30 to 35 do not contain any binary image, the control advances to the processing for the next part without any processing. For part 11, the flow advances to step S1104 to compute an average value ave_color of R, G, and B values (or may be Y, U, and V values or the like) of the original image 100 corresponding to a white portion of the binary image. In step S1105, the corresponding binary image is looked up, and ave_color is substituted in density data of pixels corresponding to black pixels. That is, the density of the text image is converted into the average density of the image around text. The aforementioned process is repeated for parts 12, 13, 21, 22, and 23 containing the text area.

In this way, the text portion is filled with the average value of pixel densities around that portion. Then, the image in which the text portion is painted is reduced by the reduction unit 105, and is compressed by JPEG to generate a compressed code 112. In this embodiment, reduction in the reduction unit 105 is implemented by simple decimation. Note that the order of this reduction process and text portion paint process may be reversed. In this case, a positional deviation, if any, between the binary image and reduced image must be taken care of.

<Format Generation>

A format that combines four data, i.e., the text area coordinate data 109, text portion representative colors 110, and compressed codes 111 and 112 may be generated as needed. This format may be the PDF or XML.

Alternatively, these four data, i.e., the text area coordinate data 109, text portion representative colors 110, and compressed codes 111 and 112 may be compressed by a reversible compression method together.

<Expansion Process>

Figure 2:
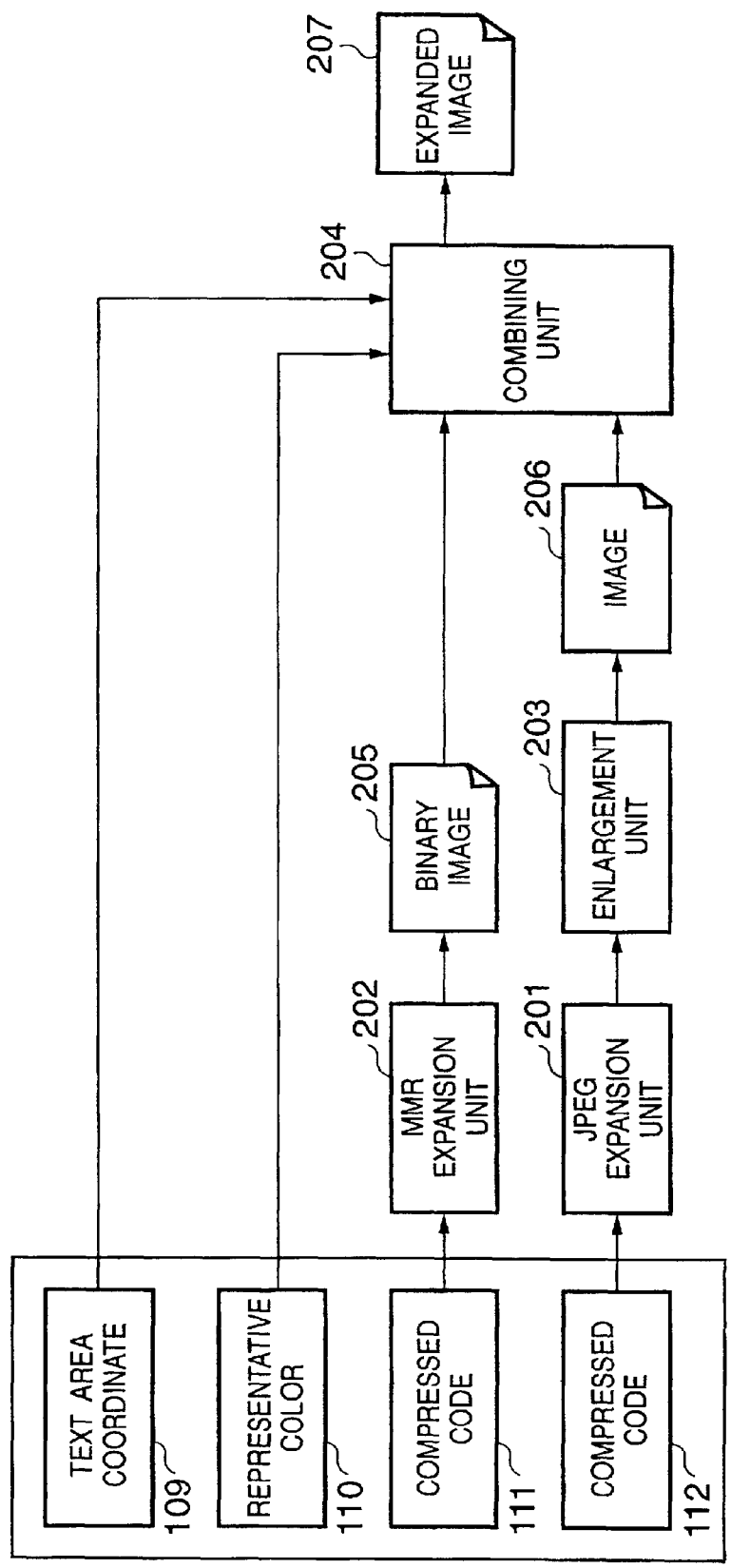
FIG. 2 is a block diagram of an expansion apparatus according to the first embodiment of the present invention.

The arrangement for explaining an image compressed by the image processing apparatus of this embodiment will be explained below using FIG. 2.

Reference numeral 201 denotes a JPEG expansion unit for receiving the compressed code 111, and expanding it by JPEG to generate multi-valued image E. Reference numeral 202 denotes an MMR expansion unit for receiving the compressed code 112 to generate a binary image 205. Reference numeral 203 denotes an enlargement unit for receiving the multi-valued image and enlarging it to generate an image 206. Reference numeral 204 denotes an image combining unit for receiving the coordinate and representative color data of text areas, selecting the image 206 for a white portion and the corresponding representative color for a black portion with reference to the binary image 205, and generating an expanded image 207 as a final image.

Figure 14A:
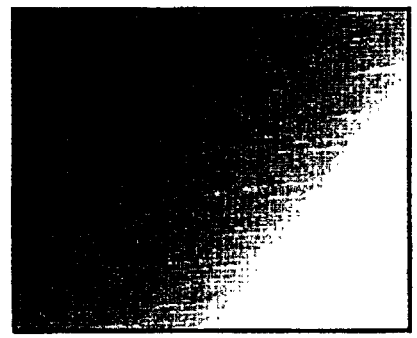
FIGS. 14A, 14B, and 14C are views for explaining a combining unit 204 of the expansion apparatus according to the first embodiment of the present invention.
Figure 14B:
Figure 14C:
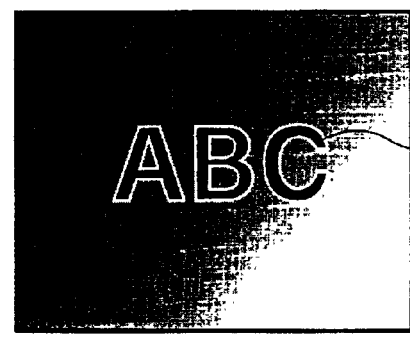

FIGS. 14A to 14C show an example of the result of the combining unit 204. FIG. 14A shows the JPEG expansion result of the compressed code 111. When a quantization irreversible scheme of JPEG is used, data having slightly different pixel values from FIG. 10C is obtained. However, pixel values change less than a case wherein the original image 100 before the text portion is extracted is compressed by the JPEG irreversible compression scheme, if the same quantization table is used. The representative color data (20, 30, 255) are superposed on corresponding image portions of black pixels with reference to the binary image expanded, as shown in FIG. 14B, thus finally obtaining the image shown in FIG. 14C. This image corresponds to the expanded image 207.

<Effect of this Embodiment>

In this way, according to this embodiment, by exploiting the characteristics of the human eye, i.e., that a low-frequency portion (mainly, a natural image area) does not require high resolution but requires excellent tone reproduction, and a high-frequency portion (mainly, a text area) requires high resolution but does not require excellent tone reproduction, the compression ratio can be increased by lowering the resolution of the background image other than the text portion. For example, since a compression ratio of 1/200 can be realized, an image attached to an e-mail message does not overload the network, light image operation is assured, and a high-quality image can be provided.

<Modification>

Figure 15:
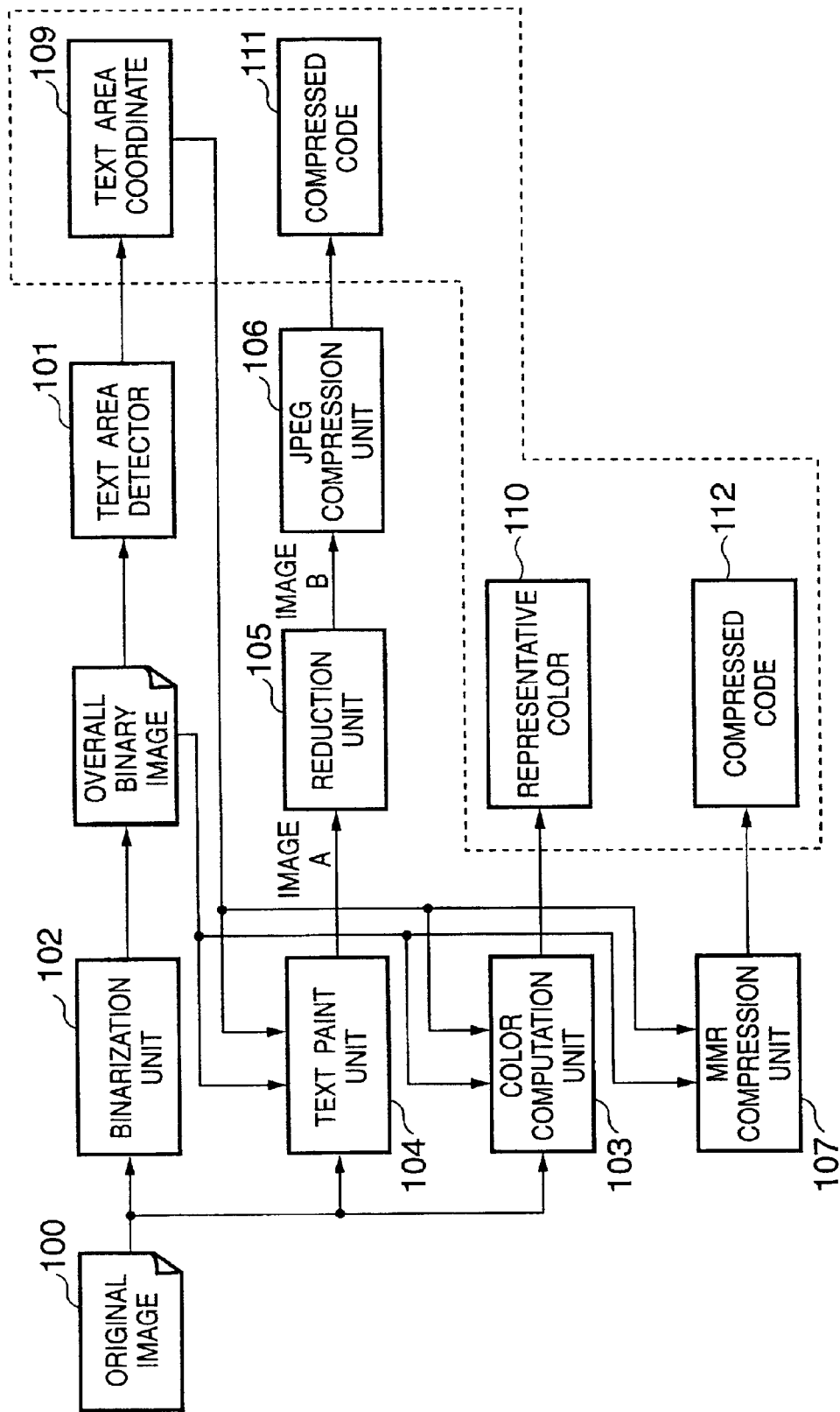
FIG. 15 is a block diagram showing a modification of the first embodiment of the present invention.

In this embodiment, the binarization unit 102 binarizes each text area. However, the present invention is not limited to this. For example, a binary image used in the text area detector 101 may be used. In this case, the arrangement shown in FIG. 15 is used.

Figure 16:
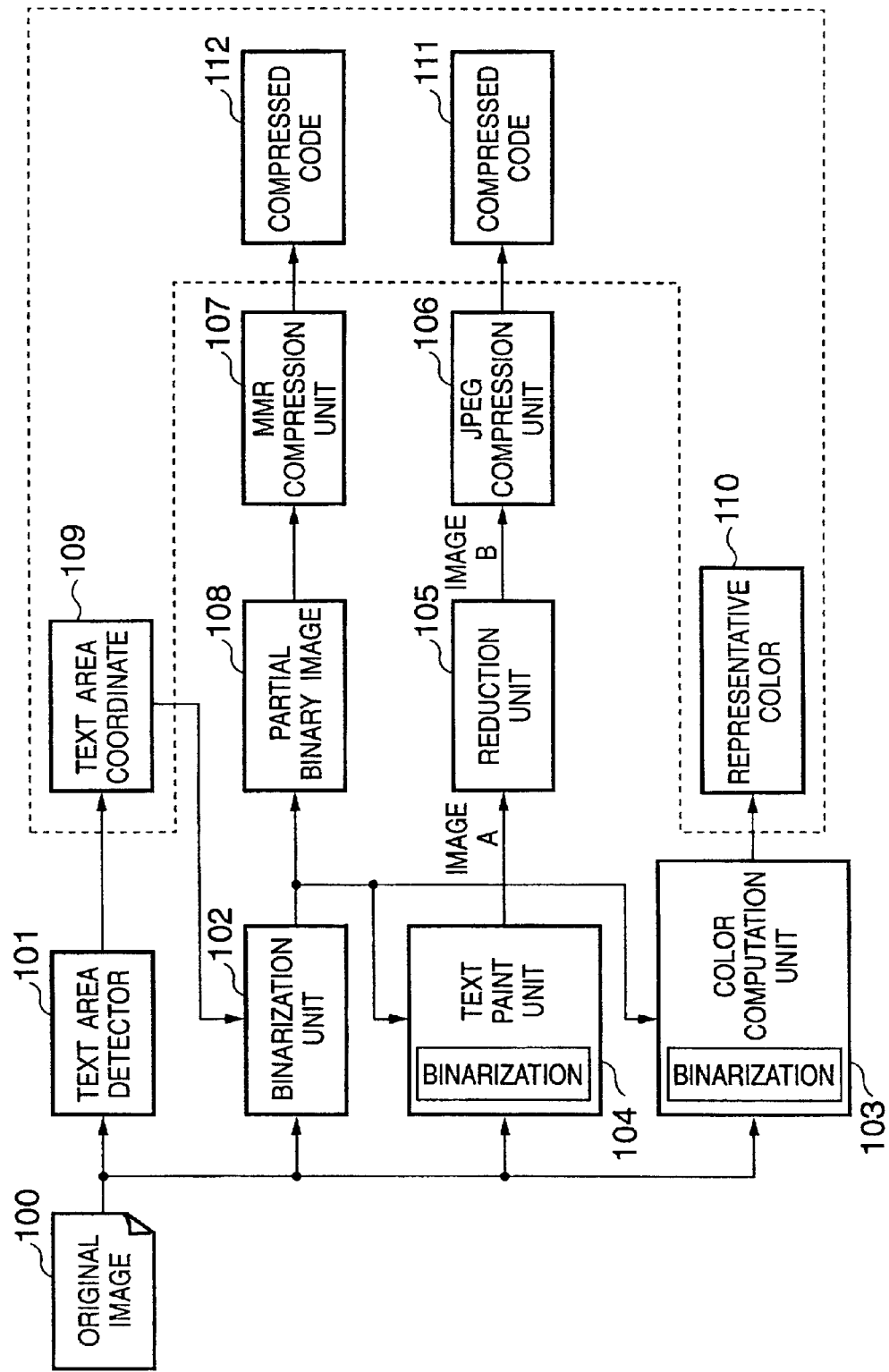
FIG. 16 is a block diagram showing a modification of the first embodiment of the present invention.

In FIG. 1, the text paint unit 104 and color computation unit 103 use partial binary images 108. However, the present invention is not limited to this. For example, only the text area coordinate data and original image 100 may be input, and a new binarization result of the original image 100 may be used in the color computation process. In such case, the text paint unit 104 and color computation unit 103 may respectively incorporate optimal binarization means in the arrangement shown in FIG. 16.

In this embodiment, the text area detector finally couples areas having similar patterns and positions in step S306 in FIG. 3, but they need not be coupled. In this case, 100 or more text areas are extracted from the image shown in FIG. 4, but the subsequent color computation process can be flexibly done. For example, even when most of 20 characters in a line are black but include some red characters, such change in color can be flexibly coped with.

Figure 17:
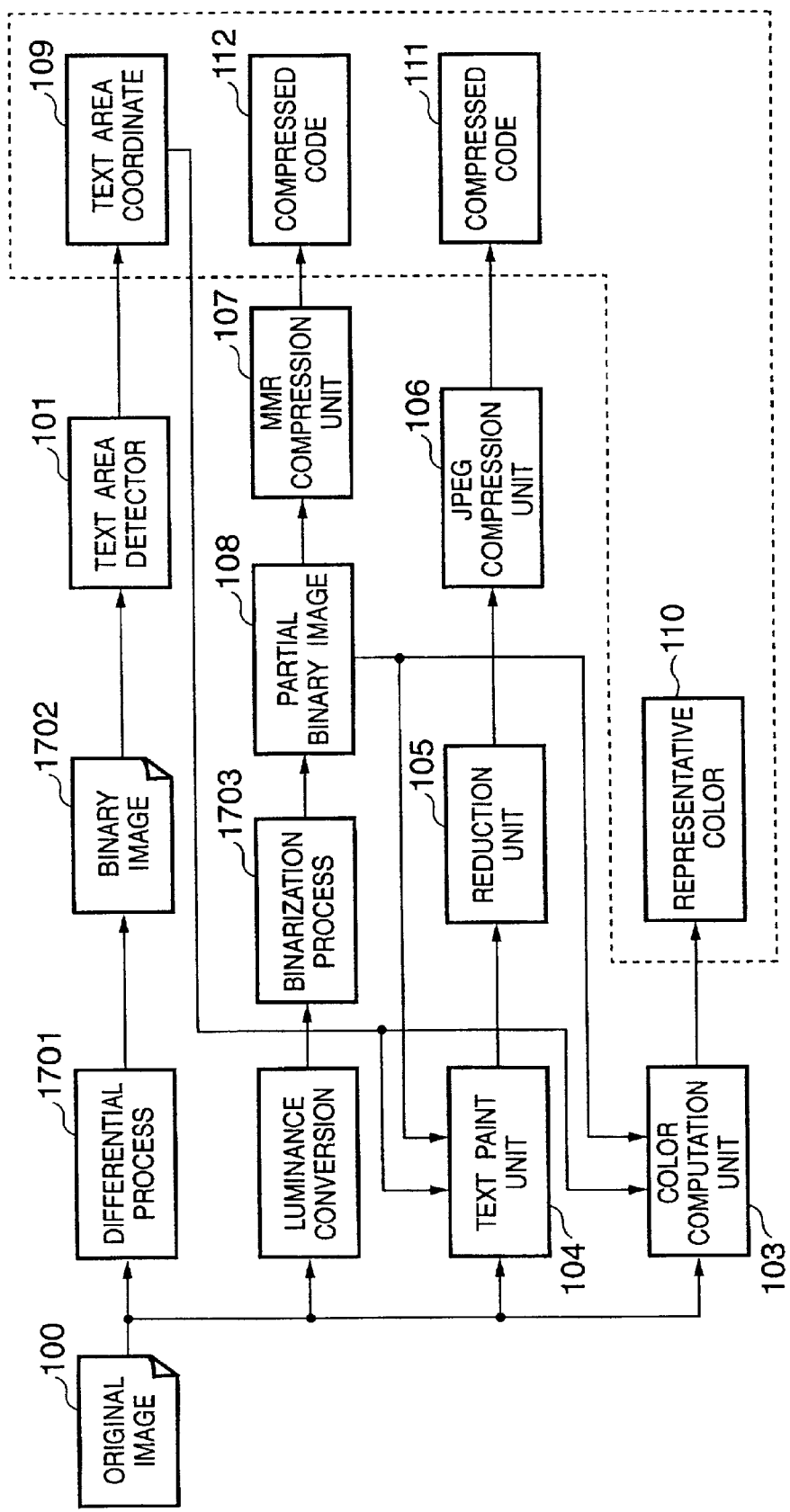
FIG. 17 is a block diagram showing a modification of the first embodiment which can also cope with reversed characters.

In this embodiment, a high-luminance character (reversed character) on a low-luminance background cannot be processed. However, this process is enabled when, for example, the arrangement shown in FIG. 17 is adopted. Reference numeral 1701 denotes a differential processor, which applies a differential filter shown in FIG. 18A or 18B to pixels including the pixel of interest as the center, and binarizes a pixel to black if the absolute value exceeds a threshold value or white if the absolute value does not exceed the threshold value. FIG. 18A shows first-order differential filters. The upper filter can detect a horizontal line, and the lower filter can detect a vertical line. Using the total of the absolute values of the two filters, an oblique line can be detected. Alternatively, a filter for an oblique line may be used. FIG. 18B shows a second-order differential filter, which can cope with all directions. Second-order differential filters for horizontal and vertical directions may be prepared. Such filter is applied to all pixels to generate a differential binary image 1702. At this time, when a filter is applied while decimating pixels in place of all pixels, the resolution can be lowered at the same time. When the binary image generated in this way undergoes the processes from step S304 in FIG. 3, text area coordinate data including reversed characters can be detected.

Figure 19A:
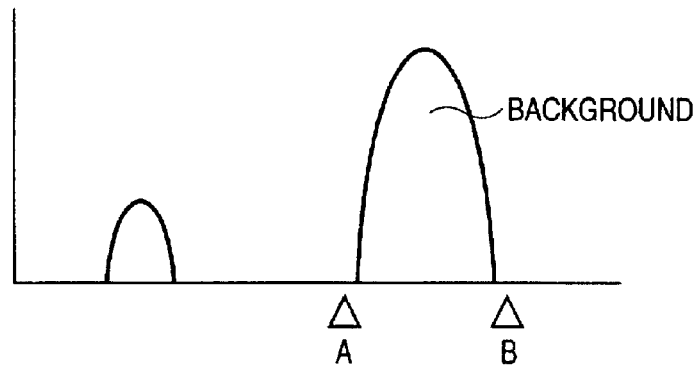
FIGS. 19A, 19B, and 19C show histogram patterns of areas input to a binarization unit 1703 in the modification of the first embodiment.
Figure 19B:
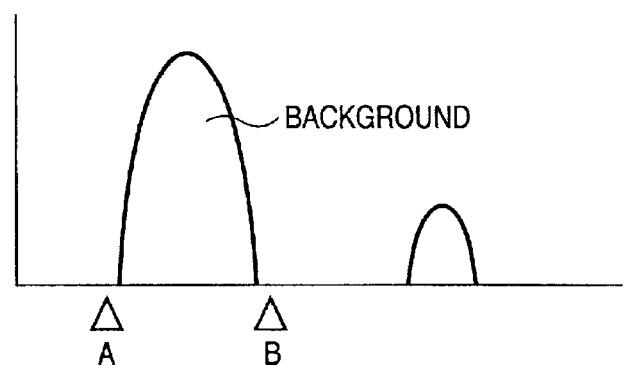
Figure 19C:
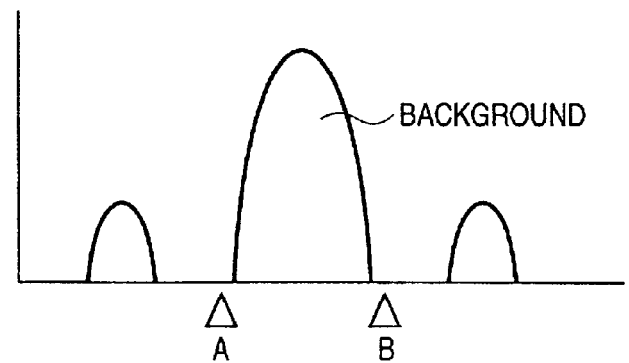

When reversed characters are to be detected, a binarization unit 1703 must also be modified. When a reversed text area is extracted as a text area, three patterns of multi-valued data shown in FIGS. 19A to 19C are mainly input, although this embodiment assumes input of only the pattern shown in FIG. 9. FIG. 19A shows the same pattern as that in FIG. 9, FIG. 19B shows a reversed character, and FIG. 19C shows a case wherein two color characters, i.e., black and white characters are present on a single gray background. In consideration of these three patterns, the binarization unit 1703 can execute a binarization process for detecting points A and B, and determining an area sandwiched between A and B to be white, and other areas to be black. Alternatively, one threshold value that separates the background and text portion may be detected disregarding the case in FIG. 19C, and a reversed pattern may be reversed.

When the reversed text area is detected in this way, since the reversed text area which is left on the image to be compressed by JPEG in the first embodiment can be smoothed by the text portion paint process, high compression efficiency can be assured, and the reversed text portion can be compressed without any deterioration of the resolution and mosquito noise.

(Second Embodiment)

Figure 20:
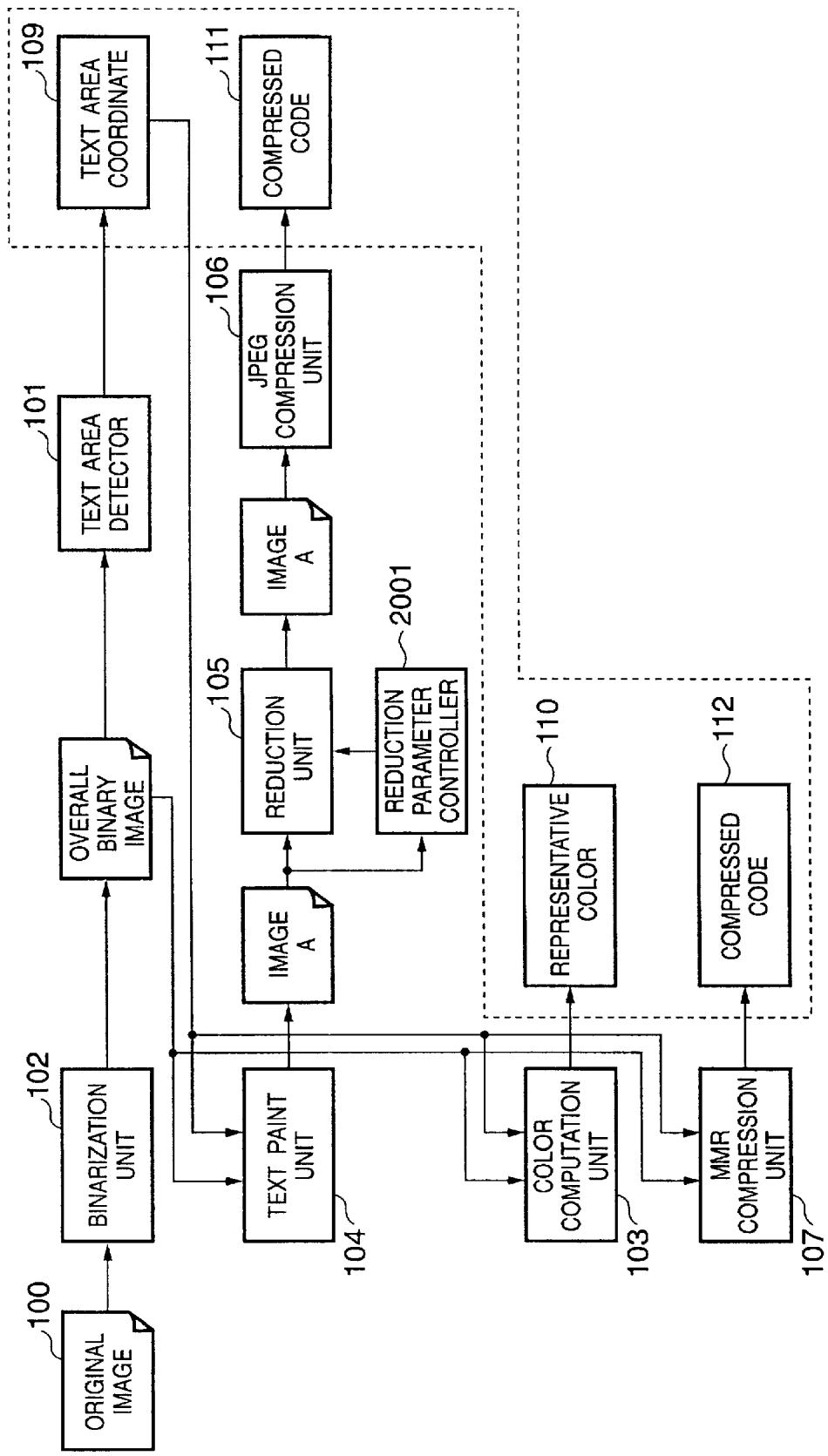
FIG. 20 is a block diagram showing an image processing apparatus according to the second embodiment of the present invention.

An image processing apparatus according to the second embodiment of the present invention will be described below using FIG. 20.

In the first embodiment, the reduction ratio in the reduction unit 105 is constant irrespective of the types of images. Alternatively, in this embodiment, a reduction parameter controller 2001 for determining a reduction parameter (e.g., ½, ¼, or the like) of resolution conversion is provided, as shown in FIG. 20.

This reduction parameter controller 2001 computes the orthogonal transforms of 8×8 pixels for the entire surface of image A. If the number of areas with large coefficients of high-frequency portions in the orthogonal transformation result is equal to or larger than a threshold value, the controller 2001 adjusts the reduction parameter to ½; otherwise, it adjusts the reduction parameter to ¼.

The number of reduction parameters is not limited to two, but three reduction parameters (not reduced, ½, ¼) may be used. In this manner, a high-frequency portion can be prevented from being reduced extremely, and deterioration of image quality can be avoided.

Upon determining the reduction parameter, a differential filter may be applied to an image, and the parameter may be switched based on the sum total of absolute values. In this method, if the sum total of the differences between neighboring pixel values is equal to or larger than a threshold value m, the parameter "not reduced" may be selected; if the sum total is equal to or larger than threshold value m, the parameter "½" may be selected; and if the sum total is smaller than n, the parameter "¼" may be selected.

According to this embodiment, resolution conversion can be controlled more flexibly, and image quality can be further improved.

(Third Embodiment)

An image processing apparatus according to the third embodiment of the present invention will be described below using FIGS. 21 to 26.

In the above embodiment, all text images in a given text area are expressed by one representative color. However, in this embodiment, compression is made so that text images in a text area can be expressed by a plurality of colors. Except for this features, since this embodiment has the same arrangement and effects as in the first embodiment, the same reference numerals denote the same building components, and a detailed description thereof will be omitted.

Figure 21:
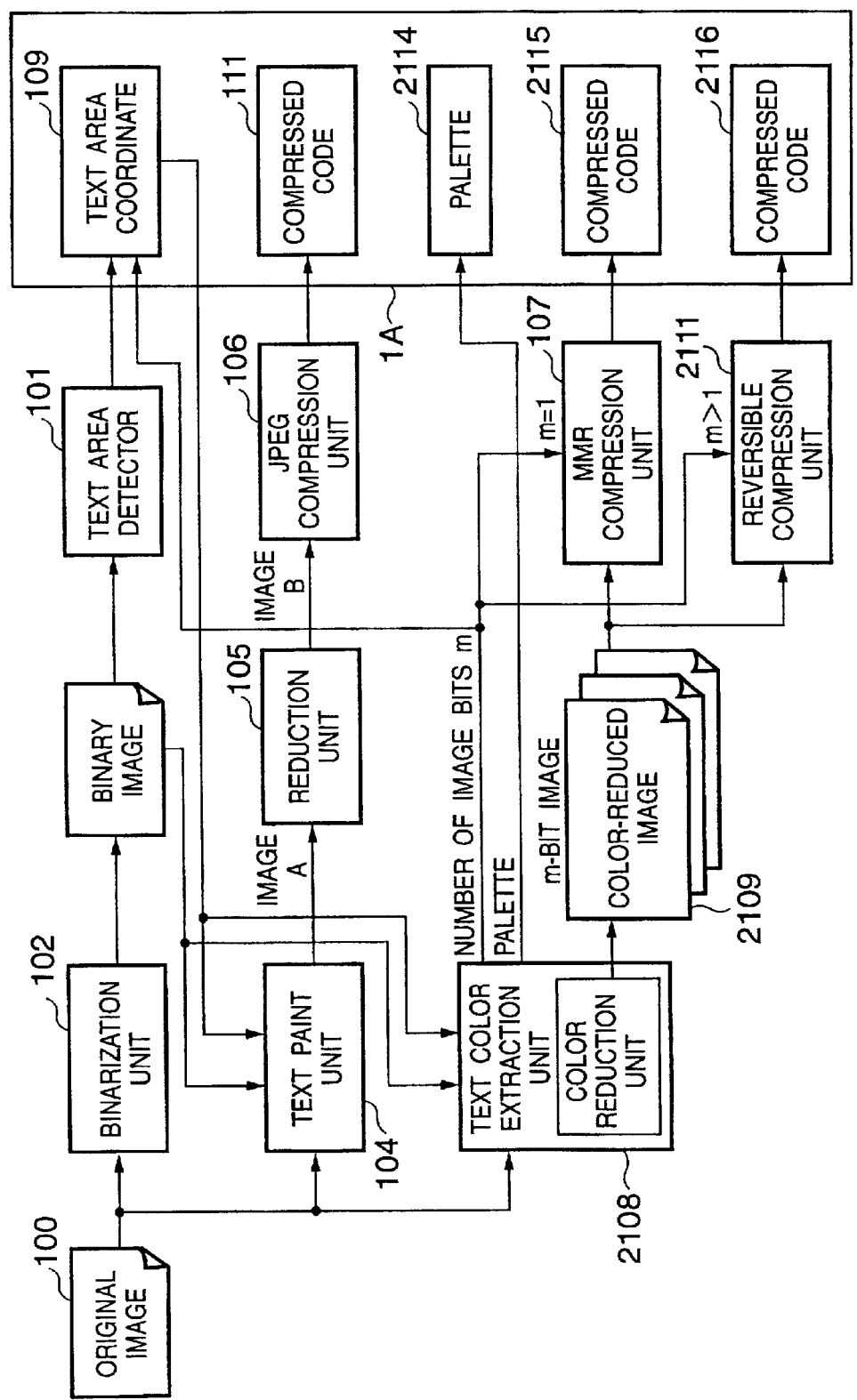
FIG. 21 is a schematic block diagram showing the arrangement of an image processing apparatus according to the third embodiment of the present invention.

Referring to FIG. 21, reference numeral 2108 denotes a text color extraction unit for receiving text area coordinate data 109, computing the colors of a portion in an original image 100 corresponding to a black image portion of a binary image 2103 with reference to the original image 100 and binary image 2103 at a given coordinate position, and reducing the number of colors to generate a plurality of palettes 2114. The text color extraction unit 2108 includes a color reduction unit 1082 that executes a color reduction process of the original image. Reference numeral 2109 denotes color-reduced images of a plurality of text areas of the original image 100, which images have undergone the color reduction process of the color reduction unit 1082 in the text color extraction unit 2108. The MMR compression unit 107 receives color-reduced images 2109 when each color-reduced image 2109 consists of 1 bit (binary), and compresses them by MMR to generate a plurality of compressed codes 2115 corresponding to these color-reduced images 2109. Reference numeral 2111 denotes a reversible compression unit for receiving color-reduced images 2109 when each color-reduced image 2109 consists of 2 bits or more, and reversibly compressing them (e.g., by ZIP) to generate a plurality of compressed codes 2116 corresponding to these color-reduced images 2109.

The text area coordinate data 109, compressed code 111, palettes 2114, compressed codes 2115, and compressed codes 2116 are combined to obtain compressed data. If all text areas are expressed by 1 bit, no compressed codes 2116 are generated. Also, if no text areas are present, compressed data 1A contains only compressed code 111.

Figure 22:
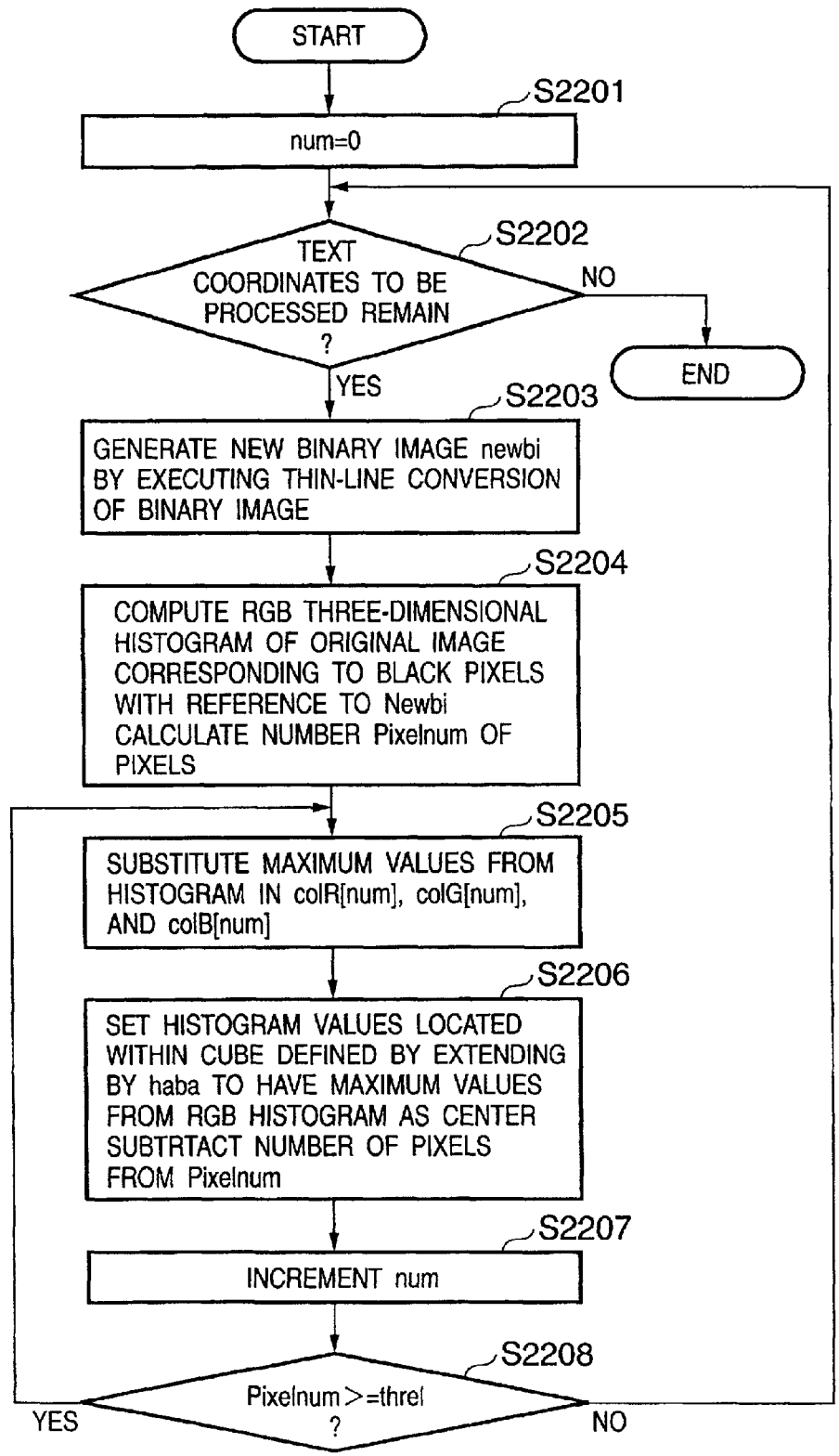
FIG. 22 is a flow chart showing the processing of a color reduction unit 1082 of the image processing apparatus according to the third embodiment of the present invention.

FIG. 22 is a flow chart showing the process in the text color extraction unit 2108 including the color reduction unit 1082.

In step S2201, a counter num indicating the number of extracted colors is reset to zero, since processing is done for each of all extracted text areas.

It is checked in step S2202 if text coordinate data to be processed still remain. If YES in step S2202, the flow advances to step S2203; otherwise, this processing ends.

In step S2203, that portion of a binary image 2103, which is located at the text coordinate position to be processed, undergoes thin-line conversion, so as to reduce black pixels corresponding to change portions from the background to character portions upon scanning by a scanner, thereby generating a new binary image "newbi".

In step S2204, an RGB three-dimensional histogram of the original image corresponding to black pixels of the image "newbi" is computed. When histograms are normally computed, if an input image is expressed by 8 bits for each of R, G, and B pixels, 256×256×256 histograms are required. Since a text portion requires high resolution but does not require excellent tone reproduction, and some pixel value differences are preferably ignored upon computing a representative color while suppressing variations at the time of scanning by a scanner, such fine histograms are not required. Hence, in this embodiment, a three-dimensional histogram of upper 5 bits of R, G, and B 8-bit data is computed. Upon computing the histogram, the total number pixelnum of black pixels present in that text area is also computed.

This embodiment uses an RGB space, but may use other color spaces such as YUV and the like. Also, in this embodiment, a three-dimensional histogram is computed, but three one-dimensional histograms for respective colors may be computed.

In step S2205, a maximum value is calculated from the RGB three-dimensional histogram. In step S2204, the RGB three-dimensional histogram of upper 5 bits is computed to suppress noise due to variations of the scanner. Furthermore, since a maximum value of totals of neighboring values of the histogram is calculated, a practical maximum value across two histograms shown in FIG. 13 can be detected. More specifically, in a three-dimensional histogram 2301 shown in FIG. 23, a maximum value of totals of seven histogram values including a point 2302 of interest, two neighboring values in the R direction, two neighboring values in the G direction, and two neighboring values in the B direction is detected. The detected maximum value is substituted in colR[num], colG[num], and colB[num].

In step S2206, a cube which is defined by extending, e.g., three steps from the maximum value detected in step S2205 as the center is set, and histogram values located within this cube after a process to be described later are set to be zero. Three steps in the histogram of upper 5 bits correspond to 24 steps of original R, G, and B 8-bit data (256 gray levels).

Figure 23:
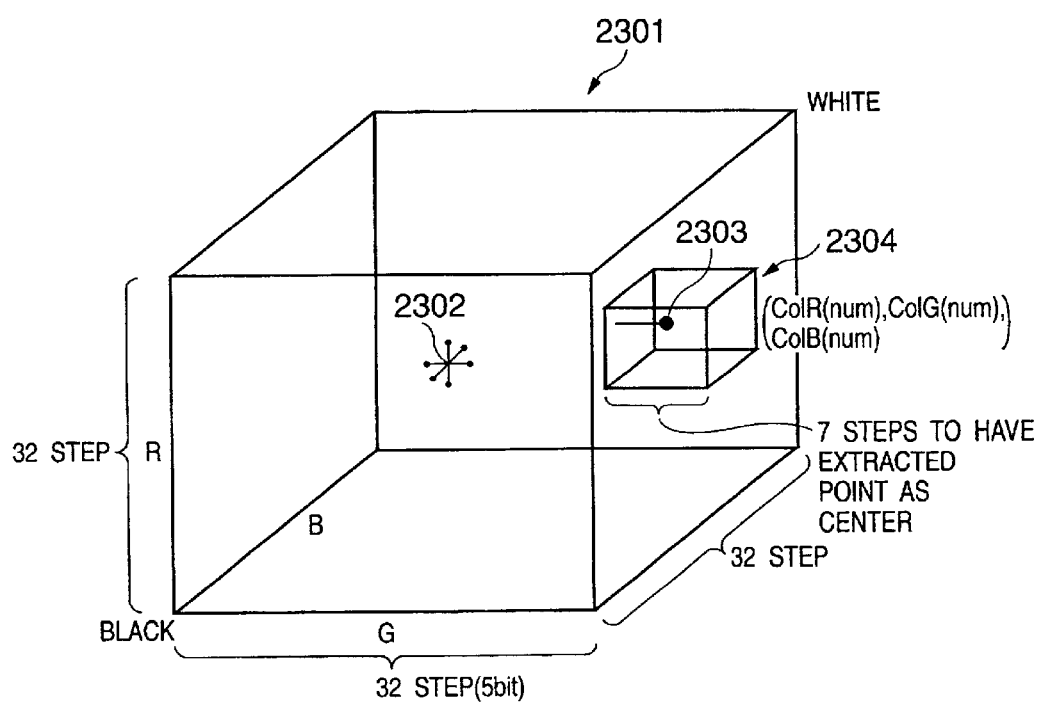
FIG. 23 is a view for explaining the processing of the color reduction unit 1082 of the image processing apparatus according to the third embodiment of the present invention.

In the RGB three-dimensional histogram shown in FIG. 23, if a black point 2303 indicates colR[num], colG[num], and colB[num], histogram values in a 7×7×7 cube 2304 obtained by extending three steps from that point are subtracted from pixelnum, and zero is substituted in the histogram values in this cube 2304.

In step S2207, num is incremented by 1.

It is checked in step S2208 if pixelnum is equal to or larger than predetermined value thre1. If YES in step S2208, the flow returns to step S2205; otherwise, the flow returns to step S2202.

By repeating the aforementioned processes for all text coordinate positions, palettes 114 of all text areas are generated. Note that this palette data describes a code that specifies a text area to which that palette belongs.

If the number of palettes of a given text area is 1, a color reduction unit 1082 extracts a text area portion of the input binary image 103 to generate a partial binary image. This binary image is a color-reduced image of that text area.

On the other hand, if the number of palettes of a given text area is 2 or more, the color reduction unit 1082 generates a color-reduced image by distributing pixel values of the original image 100 corresponding to black pixel of the binary image within the text area on the basis of the original image 100 and binary image 103. As the number of bits to be assigned, since data indicating transparency is required as a white portion of the binary image, when the number of palettes is 3, 2 bits are assigned since three plus one for transparency data equals four. On the other hand, when the number of palettes is 4, 3 bits are assigned since four plus one for transparency data equals five. The number of bits is determined according to that a finally applied image format can express.

In this case, when the number of palettes generated as a result of the color reduction process of a given text area is considerably large, and it is determined that effects of improvements of image quality and compression ratio by color reduction cannot be expected, that text area may be saved as a background image. In this case, it must be determined in the process of the text paint unit 104 that the text area is not processed as a text area and does not undergo a text portion paint process.

Figure 24:
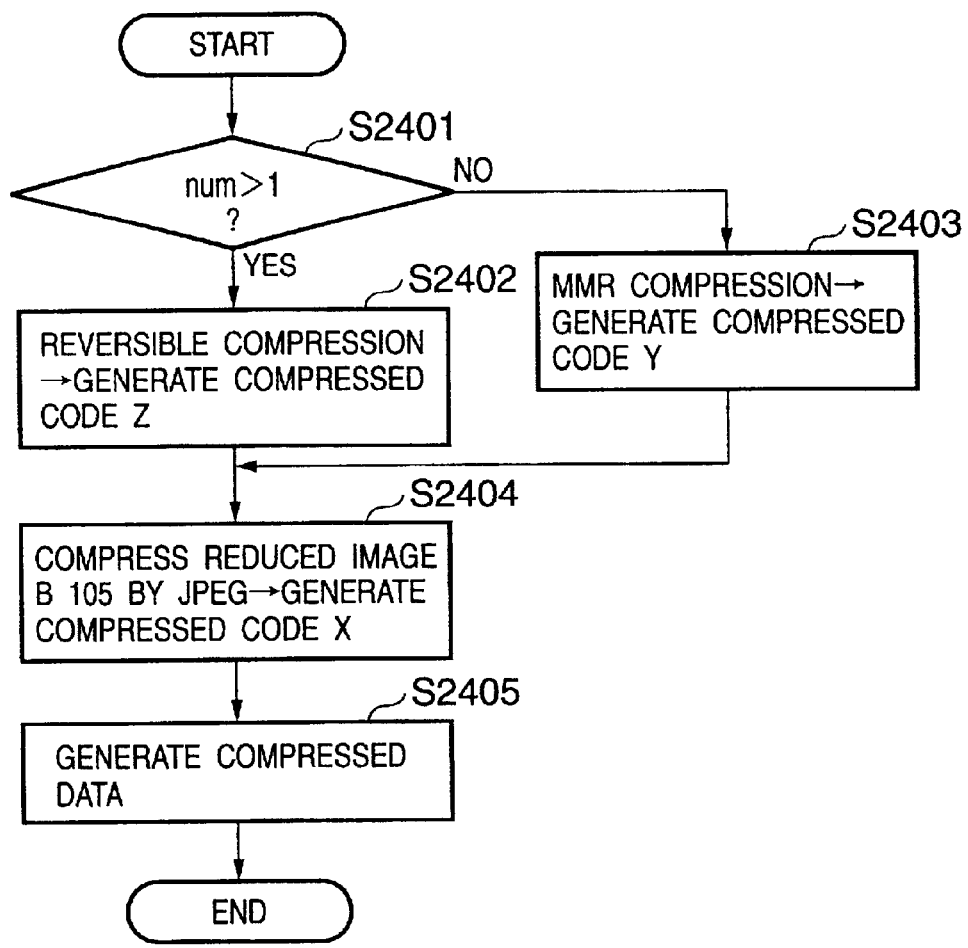
FIG. 24 is a flow chart showing the processing for generating compressed data 1A by the image processing apparatus according to the third embodiment of the present invention.
Figure 25:
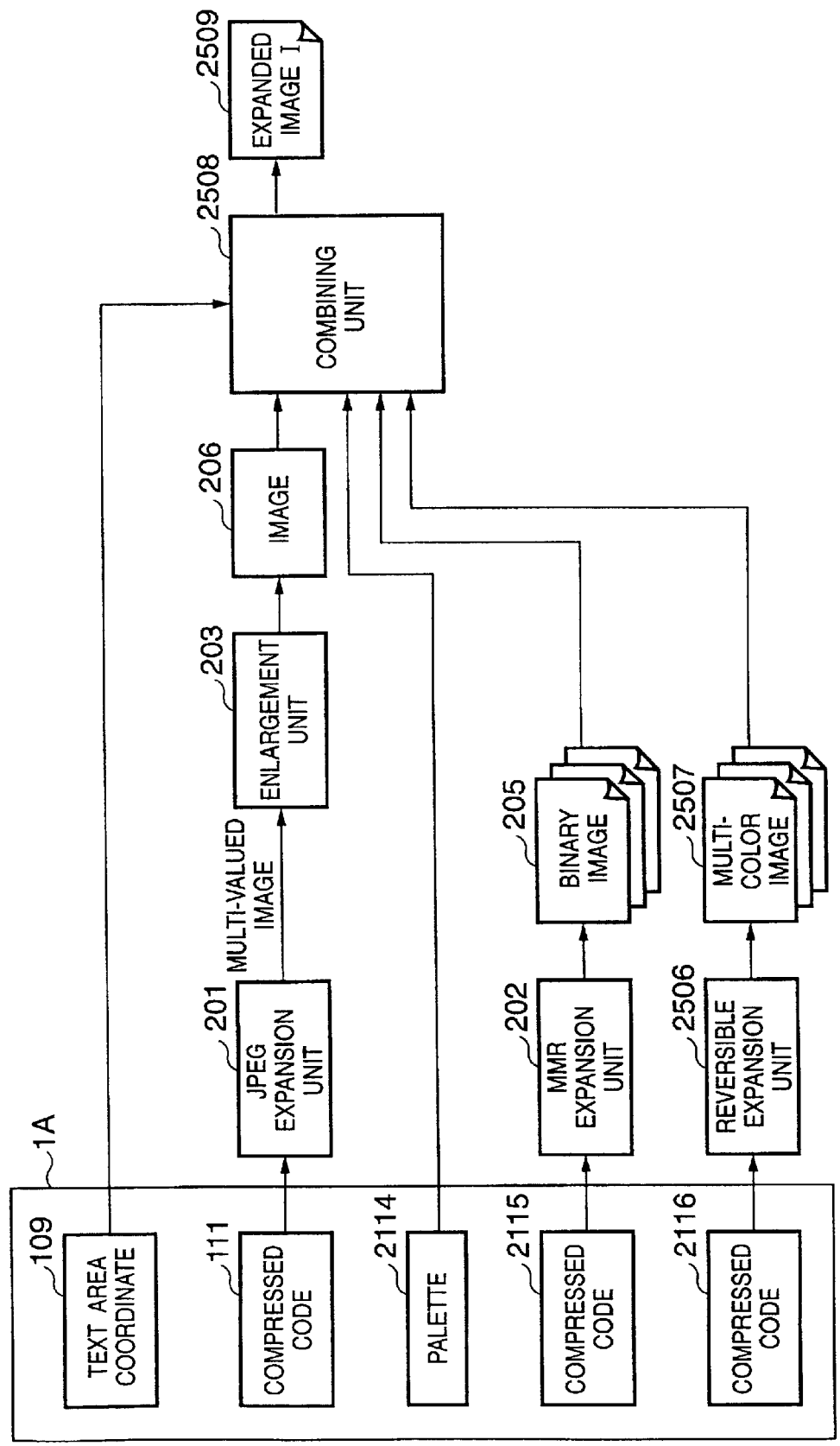
FIG. 25 is a schematic block diagram of an image expansion apparatus corresponding to the image processing apparatus according to the third embodiment of the present invention.

FIG. 24 is a flow chart for generating compressed data 1A. Note that the program code according to this flow chart is stored in a memory such as a ROM, RAM, or the like (not shown) in the image processing apparatus of this embodiment, and is read out and executed by a CPU (not shown).

When the color-reduced image 109 generated in the aforementioned sequence consists of 1 bit, this color-reduced image 109 is output from the text color extraction unit 2108 to the MMR compression unit 110 (step S2401), which compresses that image by MMR and generates a compressed code 2115 (step S2403). On the other hand, when the color-reduced image 109 consists of 2 bits or more, the image is reversibly compressed by the reversible compression unit 2111 to generate a compressed code 2116 (step S2402).

On the other hand, the JPEG compression unit 107 compresses a reduced image B 105 by JPEG to generate a compressed code 111 (step S2404). Note that the order of the processes in steps S2401 to S2403 and that in step S2404 may be reversed.

A format that combines at least one of the text area coordinate data 112, palettes 114, compressed code 111, compressed code 2115, and compressed code 2116 is generated, thus generating compressed data 1A (step S2405). The format of this compressed data 1A is not particularly limited, and the compressed data 1A may be generated by simply coupling data sequences.

With the above arrangement, upon compressing an image containing a text area having a plurality of colors, compressed data that allows that text area to have a plurality of colors can be generated.

Figure 26:
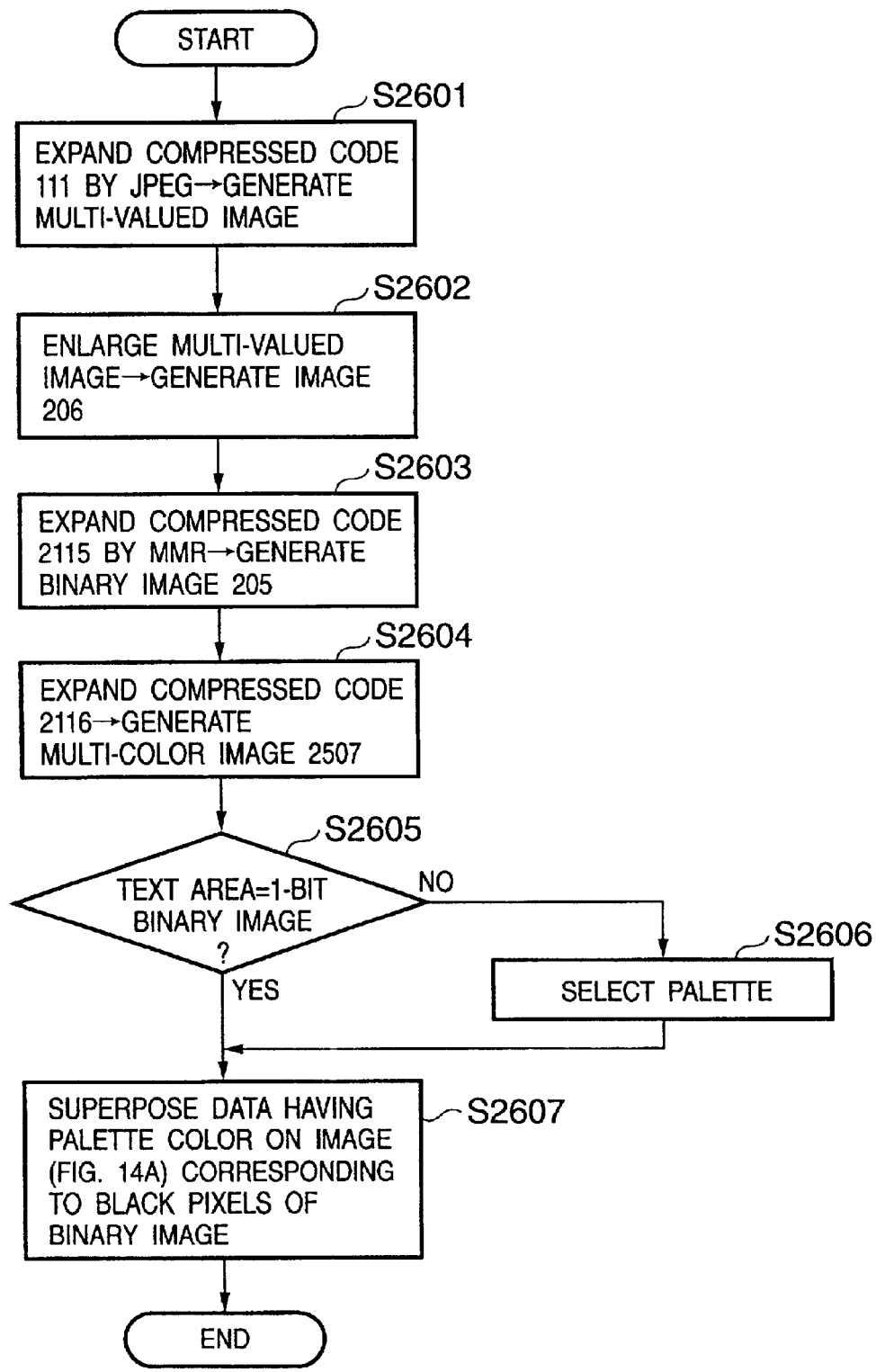
FIG. 26 is a flow chart of an image expansion process done by the image expansion apparatus according to the third embodiment of the present invention.

A schematic arrangement of an image expansion apparatus for expanding the compressed data 1A compressed as described above will be explained below using FIG. 25. FIG. 26 is a flow chart of an image expansion process done by the image expansion apparatus of this embodiment. Note that the program code according to this flow chart is stored in a memory such as a ROM, RAM, or the like (not shown) in the image processing apparatus of this embodiment, and is read out and executed by a CPU (not shown).

Reference numeral 201 denotes a JPEG expansion unit for receiving the compressed code 111, and generating a multi-valued image by executing a JPEG expansion process (step S2601). Reference numeral 203 denotes an enlargement unit for receiving the multi-valued image, and generating an image 206 by executing an enlargement process (step S2602).

Reference numeral 202 denotes an MMR expansion unit for receiving the compressed code 2115 and generating a binary image 205 by executing an MMR expansion process (step S2603). Reference numeral 2506 denotes a reversible expansion unit for receiving the compressed code 2116 and generating a multi-color image 2507 (step S2604). Reference numeral 2508 denotes a combining unit for receiving the text area coordinate data 109, corresponding palettes 2114, and binary image 205 or multi-color image 2507, and generating an image 2509 as a final image by selecting the pixel color of the image 206 when pixel data of the binary image or multi-color image indicates transparency, and selecting a corresponding pallet color in other cases.

On the other hand, when a text area is a multi-color image, the number of palettes changes (step S2605). For example, if 2 bits are assigned, palettes assigned to four pixel values 00, 01, 10, and 11 are selected and applied (step S2606). One (e.g., 00) of these pixel values indicates transparency, and the pixel density of the JPEG-expanded image 206 is selected for a pixel position having the value 00.

The aforementioned image expansion apparatus and method expand the compressed data of this embodiment to reclaim an image, and can assign a plurality of colors to a given text area when the text area contained in that image originally has a plurality of colors.

In the above embodiment, a background image undergoes JPEG compression, a text binary image undergoes MMR compression, and a text multi-valued image undergoes ZIP compression. However, the present invention is not limited to this, and three types of compression methods, i.e., a first compression method suitable for a 256-level multi-valued image, a second compression method suitable for a binary image, and a third compression method suitable for a multi-valued image having around 16 levels need only be used. The second and third compression methods may be the same method.

(Fourth Embodiment)

Figure 27:
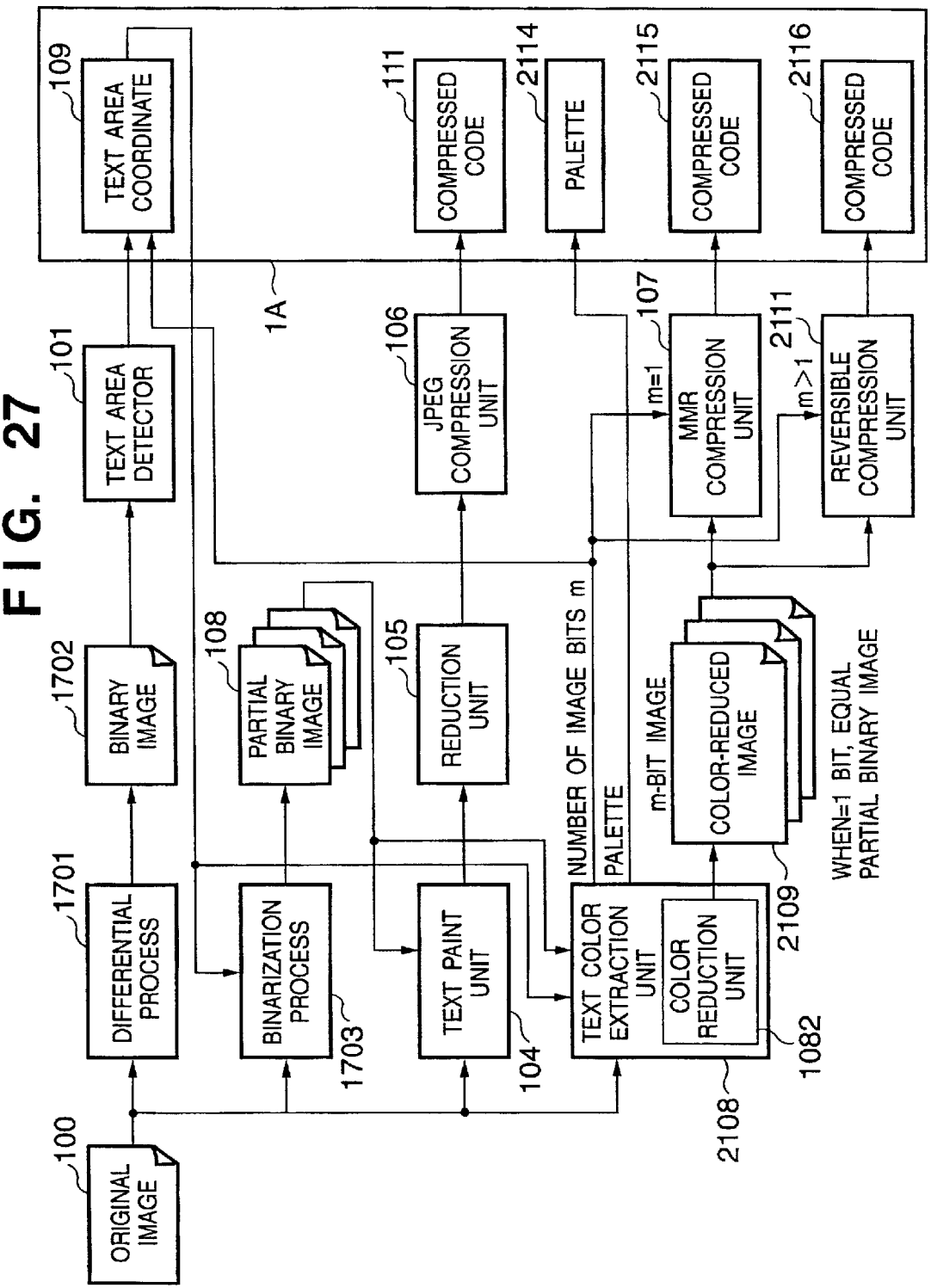
FIG. 27 is a schematic block diagram showing the arrangement of an image processing apparatus according to the fourth embodiment of the present invention.

In the third embodiment, the text area detector 101 binarizes a color image. Alternatively, a differential filter may be applied to an original image to compute edge amounts of all pixels with neighboring pixels, and a binary image obtained by binarizing these edge amounts may undergo edge trace to detect text areas. FIG. 27 shows a schematic arrangement of an image processing apparatus in this case. Since the respective building components are the same as those described in FIGS. 17 and 21, the same reference numerals denote the same building components and a detailed description thereof will be omitted.

In this embodiment, since the text paint unit 104 and text color extraction unit 2108 cannot use a binary image, a binary image for each text area is generated.

In this way, high-luminance characters (reversed characters) on a low-luminance background can be processed.

(Fifth Embodiment)

As the fifth embodiment, an image processing apparatus which compresses more efficiently using the image processing method described in the first embodiment will be described below. This embodiment couples text areas, to which an identical representative color is assigned by the image process described in the first embodiment, to handle them as a single text area.

Figure 28:
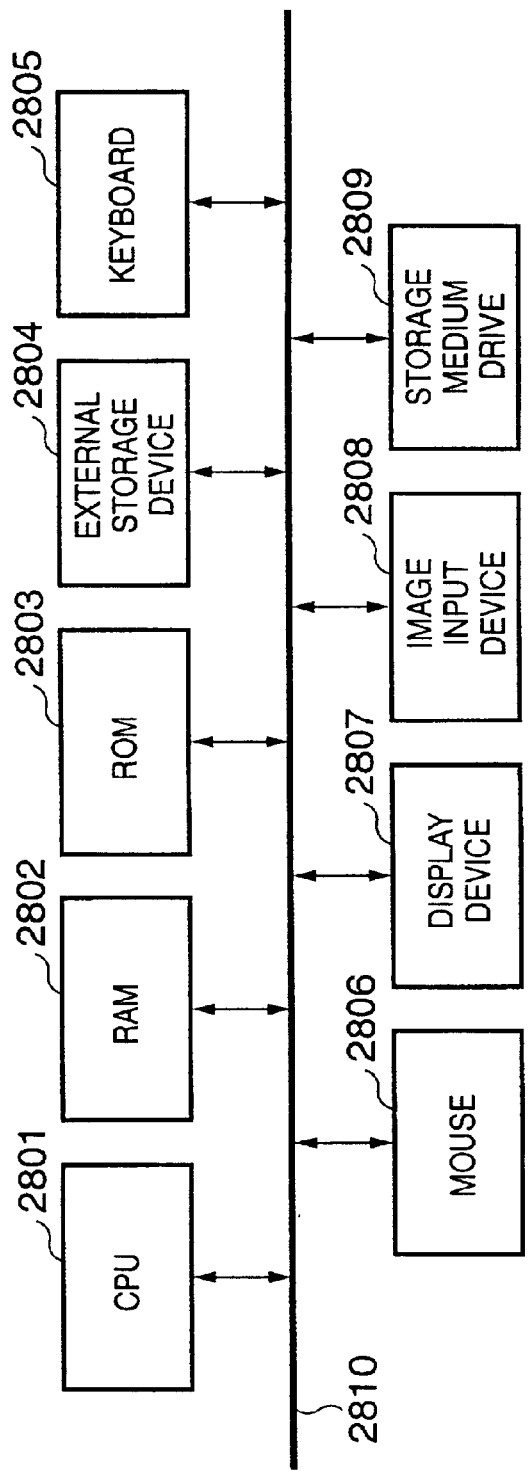
FIG. 28 is a schematic block diagram showing the arrangement of an image processing apparatus according to the fifth embodiment of the present invention.

FIG. 28 shows the basic arrangement of an image processing apparatus of this embodiment. A CPU 2801 controls the overall apparatus of this embodiment and executes an image compression process using programs and data stored in a RAM 2802 and ROM 2803. The RAM 2802 has an area for temporarily storing programs and data loaded from an external storage device 2804 and storage medium drive 2809, image data input from an image input device 2808, and the like, and also a work area used by the CPU 2801 upon executing various processes. The ROM 2803 stores control programs and boot program of the overall apparatus, setup data of the apparatus, and the like. The external storage device 2804 comprises, e.g., a hard disk, and can save programs, data, and the like loaded from the storage medium drive 2809. Also, when the work area size has exceeded the size of the RAM 2802, the device 2804 can provide the extra area as a file. A keyboard 2805 and mouse 2806 serve as pointing devices, which allow the user to input various instructions to the apparatus of this embodiment.

A display device 2807 comprises a CRT, liquid crystal display, or the like, and can display image information and text information. The image input device 2808 comprises a scanner, digital camera, or the like, can input an image as data, and includes an interface for connecting the apparatus of this embodiment. The storage medium drive 2809 comprises a CD-ROM drive, DVD-ROM drive, floppy disk (FD) drive, or the like, and can load programs, data, and the like from a storage medium such as a CD-ROM, DVD-ROM, FD, or the like. Reference numeral 2810 denotes a bus for connecting the aforementioned units.

Figure 29:
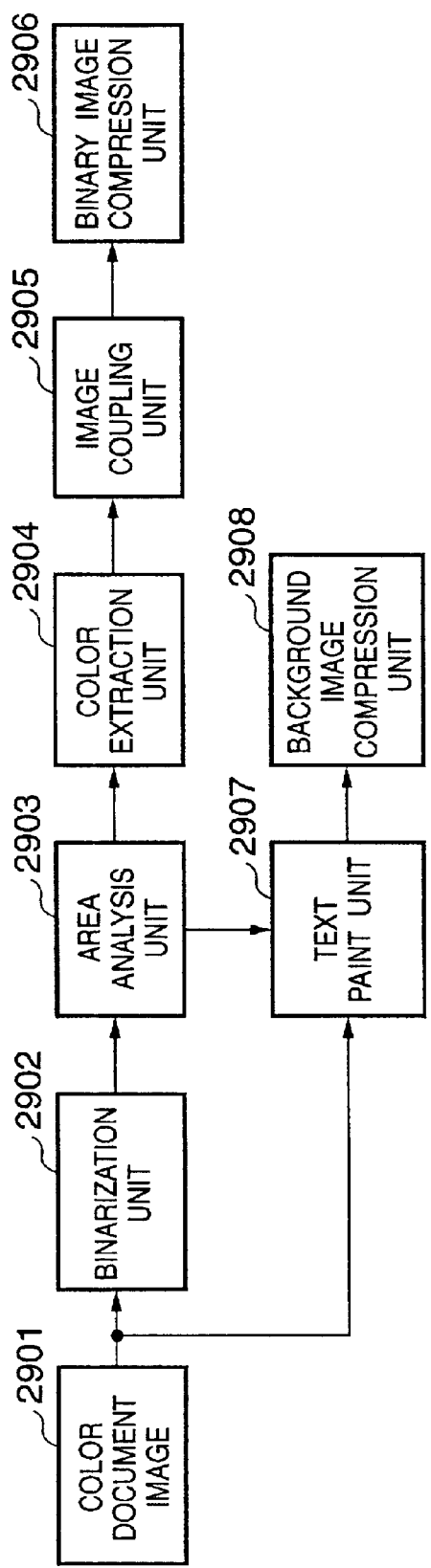
FIG. 29 is a block diagram showing the functional arrangement of the image processing apparatus according to the fifth embodiment of the present invention.

FIG. 29 shows the functional arrangement of the image processing apparatus of this embodiment. Characters contained in a color document image 2901 use a plurality of colors. A binarization unit 2902 binarizes the color document image 2901 to generate a binary image. An area analysis unit 2903 corresponds to the text area detector 101 in FIG. 1, specifies text areas in the binary image, and generates information (text image information) including the positions, sizes, and the like of the text areas in the binary image. As a method of specifying text areas, for example, a method of tracing the edges of black pixels in the binary image, labeling all black areas, and specifying a character candidate area (i.e., an area which is likely to be a text area) in each black area by searching for labeled black areas may be used. However, the present invention is not limited to such specific method.

A color extraction unit 2904 corresponds to the color computation unit 103 in FIG. 1, and extracts representative colors used for respective text areas. An image coupling unit 2905 generates an image area (to be referred to as an inclusive image area hereinafter) that includes text areas using an identical color. An image contained in a text area as the output from the area analysis unit 2903 will be referred to as a text image, and will be distinguished from an included image included in the inclusive image area. A binary image compression unit 2906 corresponds to the MMR compression unit in FIG. 1, and compresses the included image and/or text image generated by the image coupling unit 2905. A text paint unit 2907 corresponds to the text paint unit 104 in FIG. 1, and generates an image (to be referred to as a background image hereinafter) obtained by painting a text image output from the area analysis unit 2903 by a given color. The given color may be a predetermined color or the average value of pixels around the text area. A background image compression unit 2908 corresponds to the JPEG compression unit 106 in FIG. 1, and compresses the background image generated by the text paint unit 2907.

Note that the program code according to the functional arrangement shown in FIG. 29 may be stored in a storage medium, and that storage medium may be loaded into the image processing apparatus shown in FIG. 28 via the storage medium drive 2809. In this case, when the CPU 2801 executes the loaded program, the image processing apparatus with the arrangement shown in FIG. 28 serves as the apparatus having the functional arrangement shown in FIG. 29.

A color document image compression method in this embodiment will be described below using the functional block diagram of FIG. 29.

Figure 30A:
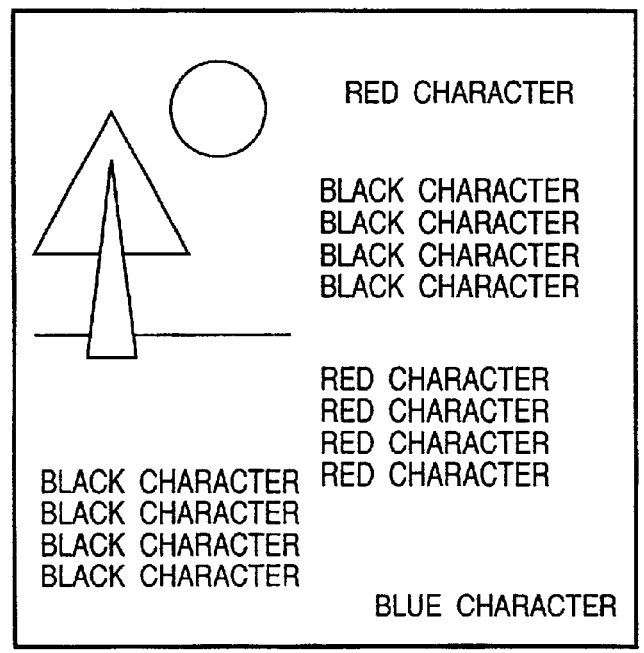

A color document image 2901 is loaded from the external storage device 2804, image input device 2808, or storage medium drive 2809 onto the RAM 2802. In this embodiment, an image shown in FIG. 30A is used as the color document image 2901.

The binarization unit 2902 generates a binary image on the basis of the color document image 2901 loaded onto the RAM 2802. A method of generating the binary image is not particularly limited, and this embodiment uses the following method. A histogram of luminance data in the color document image 2901 is computed to obtain a binarization threshold value T. This computation method is not particularly limited and, for example, a luminance value as an intermediate value of the histogram may be selected as the threshold value T. The color document image 2901 is binarized using the binarization threshold value T to generate a binary image. The generated binary image is stored in an area different from that which stores the color document image 2901 in the RAM 2802.

Figure 30B:
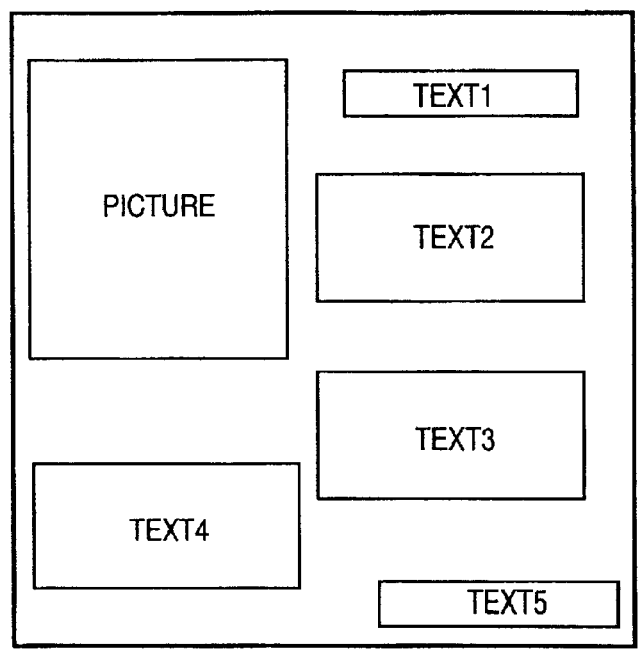

The area analysis unit 2903 specifies text areas with reference to the binary image generated by the binarization unit 2902. In this case, the aforementioned text image information is generated. If the image shown in FIG. 30A is to undergo area analysis of the area analysis unit 2903, the result shown in FIG. 30B is obtained. In FIG. 30B, text areas TEXT1 to TEXT5 are specified, and text image information is generated for each area. The text image information is output to the color extraction unit 2904 and text paint unit 2907.

The color extraction unit 2904 specifies text areas in the color document image 2901 with reference to the text image information, and extracts colors in the specified text areas, i.e., text colors in the text areas. In this embodiment, the areas TEXT1 and TEXT3 contain red characters, the areas TEXT2 and TEXT4 contain black characters, and the area TEXT5 contains blue characters in FIG. 30B. The colors of the respective text areas extracted by the color extraction unit 2904 are generated as color information.

The image coupling unit 2905 couples text areas using identical colors with reference to the color information of the text areas TEXT1 to TEXT5, which are extracted by the color extraction unit 2904. In this embodiment, only text areas from which one representative color is extracted are coupled.

Figure 30C:
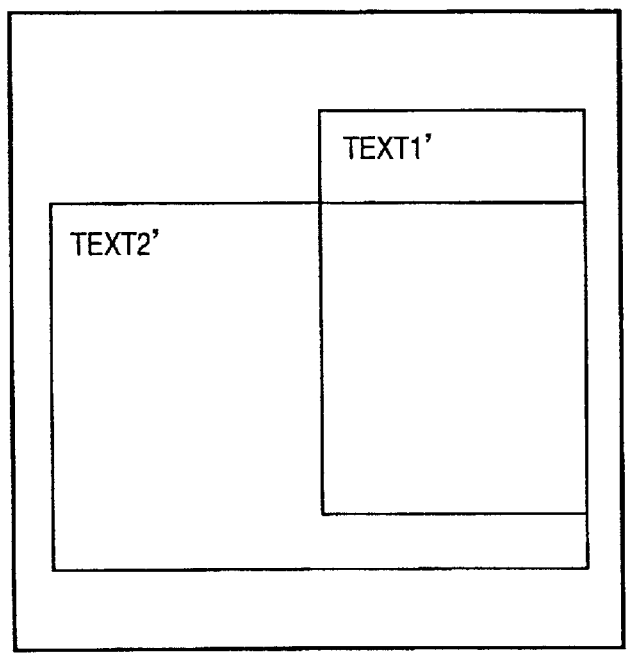

In the example shown in FIG. 30B, since the areas TEXT1 and TEXT3 contain characters using the same color, an image (inclusive image) of an area including these areas is generated. Note that generating an image including TEXT1 and TEXT3 is described as "coupling TEXT1 and TEXT3". In FIG. 30C, this inclusive image is indicated by TEXT1'. Note that pixels other than the text portion in this inclusive image are set to have a monochrome pixel value (e.g., density 0). The same applies to TEXT2 and TEXT4. Note that an inclusive image that includes TEXT2 and TEXT4 is indicated by TEXT2' in FIG. 30C.

Figure 30D:
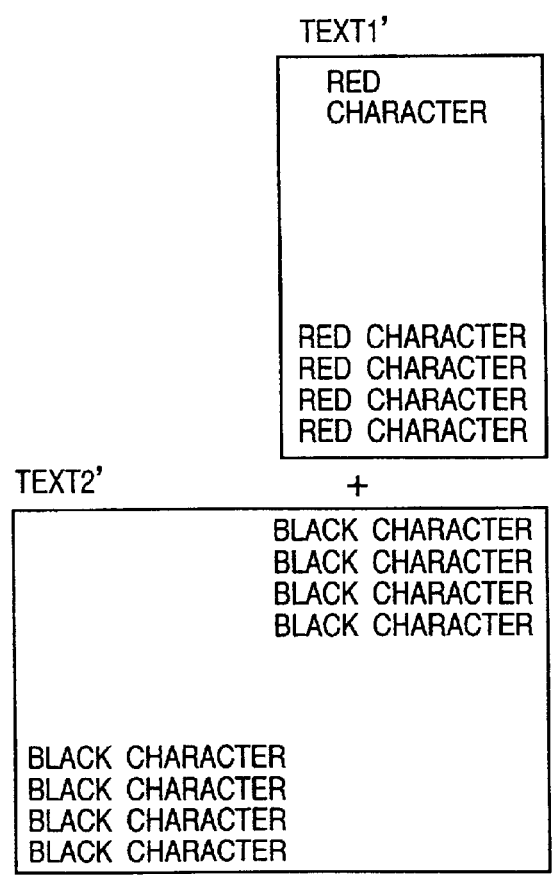

FIG. 30D shows details of inclusive images TEXT1' and TEXT2'. The image coupling unit 2905 generates inclusive image information that contains the positions and sizes of the respective inclusive images (in the binary image or color document image 2901).

The method of specifying text areas using an identical color in the image coupling unit 2905 will be explained below. When the color extraction unit 2904 extracts a color expressed by 8 bits for each of R, G, and B, a color reduction process is done to obtain a predetermined color range (e.g., 2 or 3 bits for each of R, G, and B). The color obtained as a result of the color reduction process is redefined as a representative color, and areas having an identical color are coupled. The color reduction limit is determined by desired tone reproduction of an image. For example, R, G, and B data may be respectively expressed by 2 bits, 2 bits, and 1 bit or 3 bits, 3 bits, and 2 bits by exploiting the fact that the human eye is insensitive to blue.

As the redefinition method of the representative color, the average of the inclusive area may be simply computed, or an area average may be computed. For a low-luminance color of, e.g., a black character, the lowest-luminance color in text areas of an identical color may be adopted, and for a high-luminance color of, e.g., a white character, the highest-luminance color in text areas of an identical color may be adopted, thus improving the image appearance.

When an identical color is to be discriminated more accurately, color data may be converted from an RGB format into an LAB or YCrCb format that can compare color differences more easily, and the converted color data may be rounded to 2 or 3 bits upon discrimination. In the RGB format, when black is compared with gray and dark blue, dark blue is closer to black. However, in the LAB or YCrCb format, since the luminance and color components are separated, black and dark blue can be separated.

The binary image compression unit 2906 compresses each inclusive image and/or text area, and a plurality of colors may be extracted from a text area as in the second embodiment. In such case, upon compressing a text area, the compression method is changed depending on whether the text area has one or a plurality of colors. A change in compression method is determined with reference to color palette information of the text area. If it is determined with reference to the color palette information that the text area of interest has only one color, the text area of interest is compressed by MMR; if the text of interest has a plurality of colors, it is reversibly compressed (e.g., by ZIP). The color palette information and text image information are appended as a header to the compression result.

On the other hand, upon compressing an inclusive image, MMR compression is used. The color information of this inclusive image and inclusive image information are appended as a header to this compression result. Note that color information is present for respective text areas, but all text areas in the inclusive image have identical color information. Hence, the color information of one of text areas in the inclusive image can be used as that of the inclusive image.

In this manner, five headers (headers of TEXT1 to TEXT5) are generated upon compression individual text areas, while in this embodiment, three headers (headers of TEXT1', TEXT2', and TEXT5) are generated. As a result, the number of headers can be decreased, and the compressed data size can be reduced.

The text paint unit 2907 specifies text areas in the color document image 2901 using the text image information, and generates an image (background image) obtained by painting the specified text areas by a given color. FIG. 30E shows this background image. The given color may be a predetermined color or may be the average value of pixels around the text area in the color document image 2901.

The background image compression unit 2908 compresses the image (background image) generated by the text paint unit 2907.

As described above, according to the image processing apparatus and method of this embodiment, even when a color document image including many text areas is compressed, since an image including text areas having an identical color is generated and compressed, the number of headers to be appended to the compressed image can be reduced. At the same time, the compressed data size can be reduced.

(Sixth Embodiment)

As the sixth embodiment, an image processing apparatus which compresses more efficiently using the image processing method described in the second embodiment will be described below. In this embodiment, one text area to which a plurality of color palettes are assigned by the image processing method described in the second embodiment is segmented into sub-areas, and areas are then coupled as in the fifth embodiment.

Figure 31:
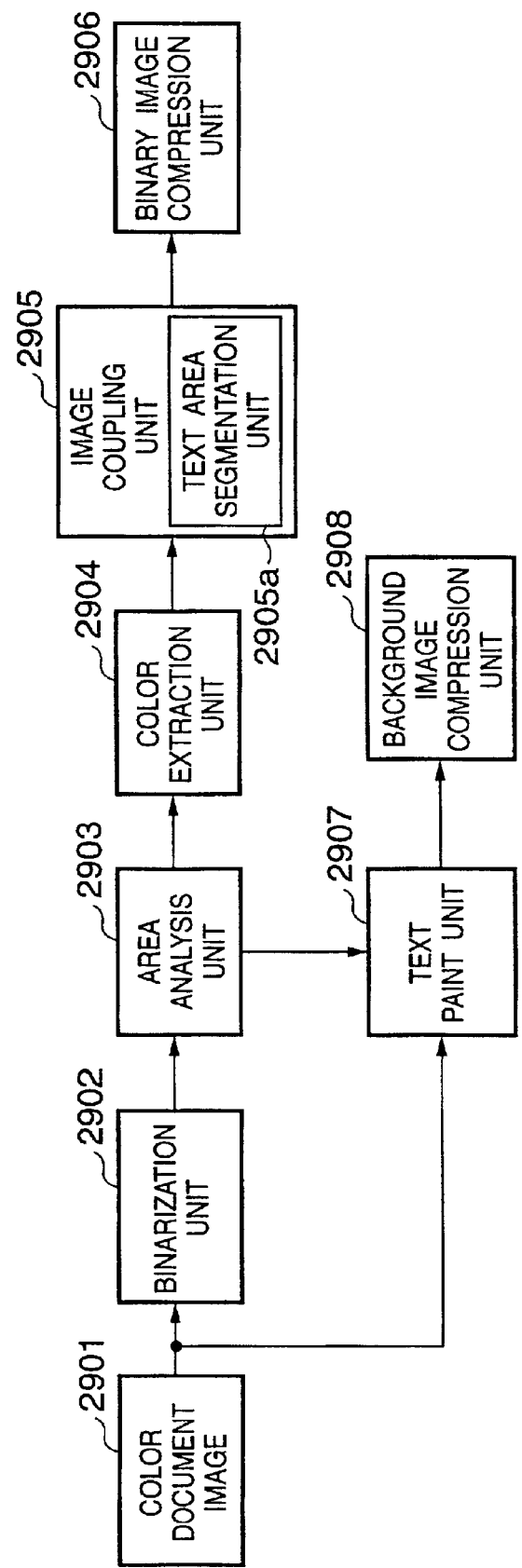
FIG. 31 is a block diagram showing the functional arrangement of an image processing apparatus according to the sixth embodiment of the present invention.

FIG. 31 shows the functional arrangement of an image processing apparatus of this embodiment. A color extraction unit 2904 corresponds to a text color extraction unit 2108 in FIG. 21, and generates a color-reduced image and color palettes by executing a color reduction process of a text image. An image coupling unit 2905 includes a text area segmentation unit 2905a. The text area segmentation unit 2905a segments a text area including a plurality of colors into sub-areas of identical colors. Since other arrangements are the same as those in FIG. 29, the same reference numerals denote the same parts, and a detailed description thereof will be omitted. In this embodiment, all text areas including a plurality of colors are segmented into sub-areas containing text of identical colors to obtain new text areas.

Figure 32A:
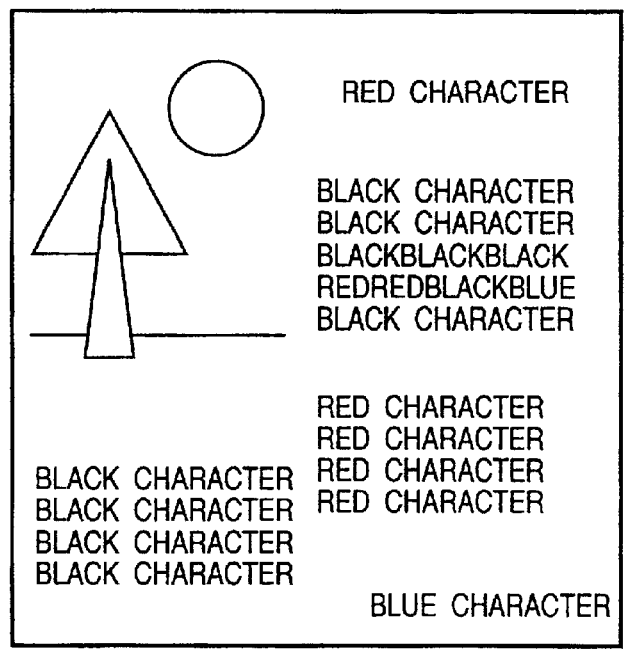
FIGS. 32A to 32F are views for explaining an inclusion process of the image processing apparatus according to the sixth embodiment of the present invention.
Figure 32B:
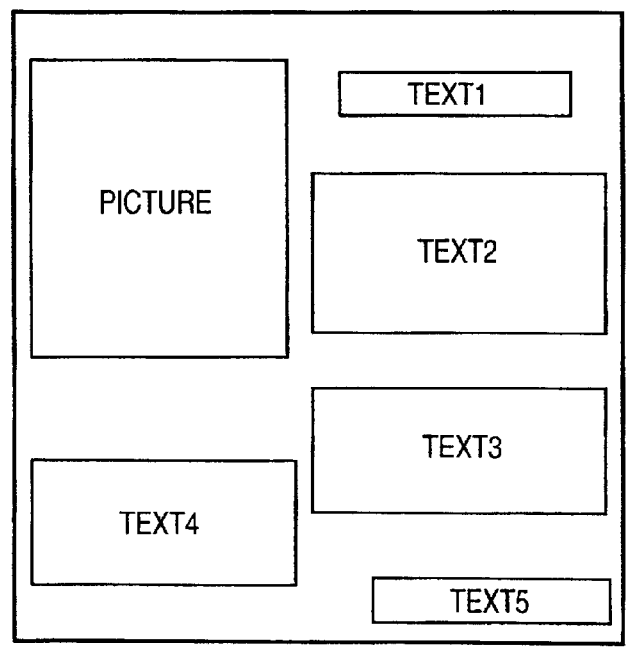

If an image shown in FIG. 32A is to undergo area analysis of the area analysis unit 2903, the area analysis result is as shown in FIG. 32B. The color extraction unit 2904 specifies text areas in the color document image 2901 with reference to the text image information, and extracts colors in the specified text areas, i.e., text colors in the text areas. In this embodiment, the areas TEXT1 and TEXT3 contain red characters, the area TEXT2 contains black, red, and blue characters, the area TEXT4 contains black characters, and the area TEXT5 contains blue characters in FIG. 32B. The color extraction unit 2904 extracts the colors of the respective text areas as color palette information.

The image coupling unit 2905 couples text areas using identical colors with reference to the color palette information of the text areas TEXT1 to TEXT5.

Figure 32C:
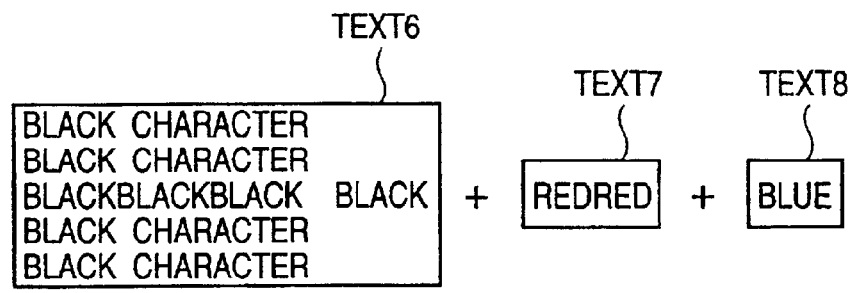

Since the area TEXT2 has three colors, the text area segmentation unit 2905a segments the area TEXT2 into areas (sub-areas) including identical color characters, as shown in FIG. 32C. An area including black characters in TEXT2 is indicated by TEXT6. An area including red characters in TEXT2 is indicated by TEXT7. An area including blue characters in TEXT2 is indicated by TEXT8. The palette information of TEXT2 is also segmented to generate black color palette information, red color palette information, and blue color palette information in correspondence with the sub-areas TEXT6, TEXT7, and TEXT8. Also, the text area segmentation unit 2905a generates sub-area information containing the positions and sizes of these sub-areas.

As the method of segmenting a text area having a plurality of colors into sub-areas, the text area further undergoes a color reduction process, and is segmented into sub-areas including areas having identical colors using the color reduction result.

Upon completion of the sub-area segmentation process by the text area segmentation unit 2905a, text areas (including sub-areas) using identical colors are coupled to generate inclusive images.

Figure 32D:
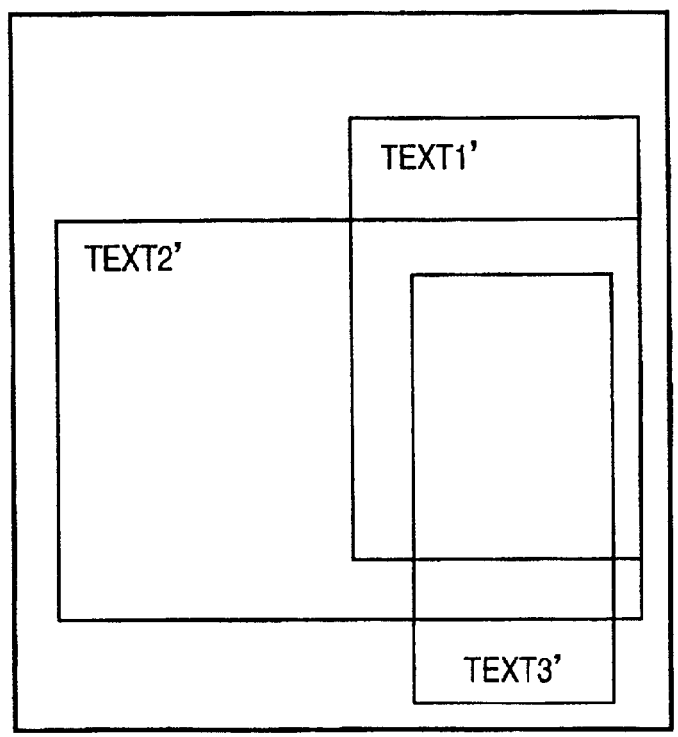

Since the areas TEXT1, TEXT3, and TEXT7 include characters using an identical color (red), an inclusive image including these areas is generated. This inclusive image area is indicated by TEXT1' in FIG. 32D.

Likewise, an area TEXT2' including areas having black characters is generated. TEXT2' includes TEXT4 and TEXT6. Also, an area TEXT3' including text areas having blue characters is generated. TEXT3' includes TEXT5 and TEXT8.

Figure 32E:
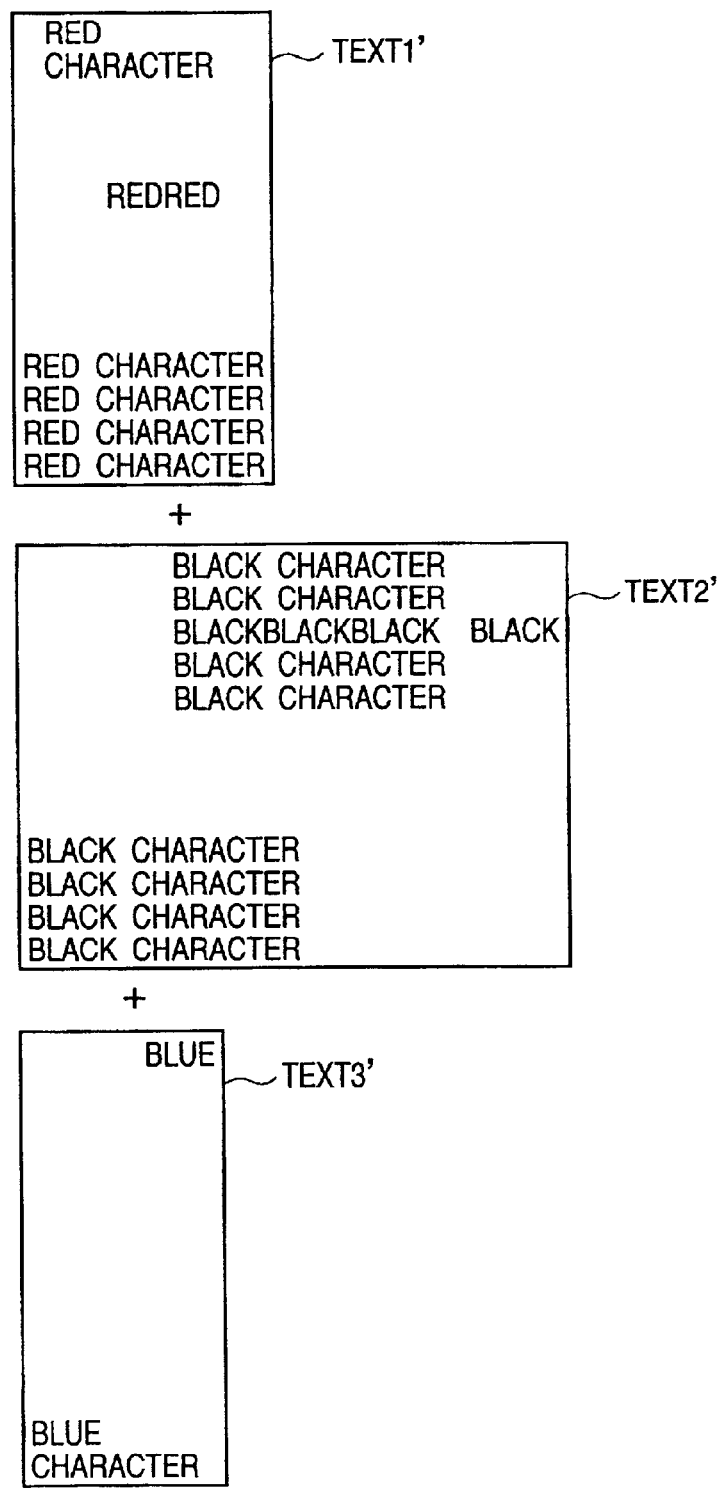

FIG. 32E shows the contents of the inclusive images TEXT1', TEXT2', and TEXT3'. Such inclusive images are output to the binary image compression unit 2906. The image coupling unit 2905 generates inclusive image information containing the positions and size (in the binary image or color document image 2901) of the respective inclusive images.

The image coupling unit 2905 directly outputs images of a text area and sub-area which are not coupled to the binary image compression unit 2906.

The binary image compression unit 2906 compresses the respective inclusive images and/or text areas and/or sub-areas. Since all the inclusive areas, text areas, and sub-areas consist of 1-bit images (having one color), MMR compression is used. As a result, compression efficiency can become higher than reversible compression (ZIP compression) used upon compressing a text area having a plurality of colors.

Upon compressing an inclusive image, a header corresponding to that inclusive image is generated, and contains color information and inclusive image information of that inclusive image. Upon compressing a text area, a header corresponding to this text area is generated, and contains color information and text image information of the text area. Upon compressing a sub-area, a header corresponding to this sub-area is generated, and contains color information and sub-area information of the sub-area.

As the color information of an inclusive image, color palette information of one of text areas (including sub-areas) in the inclusive image is used.

Upon independently compressing text areas (including sub-areas), seven headers (those of TEXT1, TEXT3, TEXT4, TEXT5, TEXT6, TEXT7, and TEXT8) are generated, while in this embodiment, three headers (those of TEXT1', TEXT2', and TEXT3') are generated. As a result, the number of headers can be decreased, and the compressed data size can be reduced.

Figure 32F:
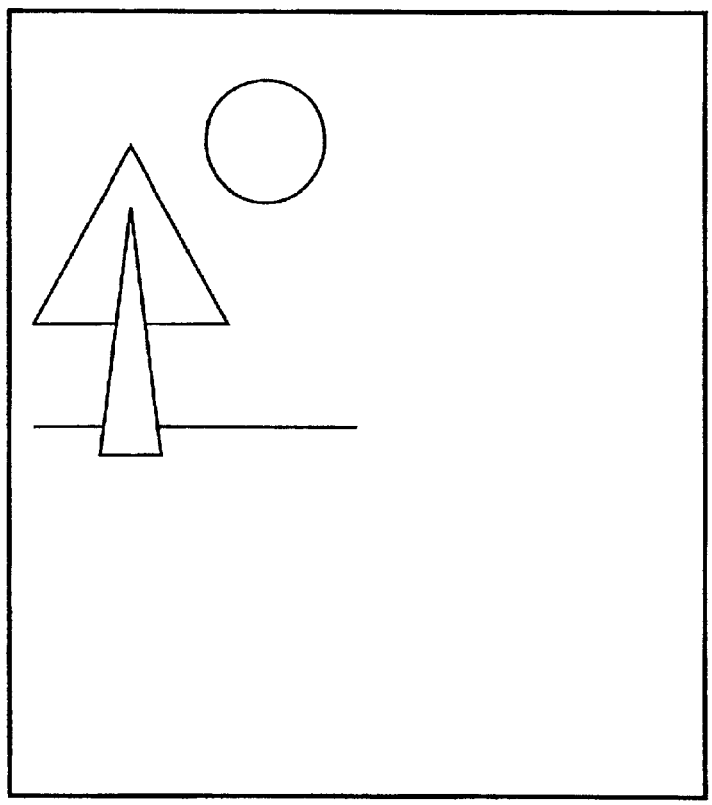

The text paint unit 2907 specifies text areas in the color document image 2901 using the text image information, and generates an image (background image: FIG. 32F) obtained by painting the specified text areas by a given color.

As described above, according to the image processing apparatus and method of this embodiment, even when a color document image including many text areas is compressed, since an image including text areas having an identical color is generated and compressed, the number of headers to be appended to the compressed image can be reduced. At the same time, the compressed data size can be reduced.

Note that a text area having a plurality of colors may be broken up into sub-areas, which may be independently compressed without being coupled. That is, MMR compression of individual segmented sub-areas often assures higher compression efficiency than reversible compression of a text area assigned a plurality of colors even when they are not coupled.

(Seventh Embodiment)

In the fifth and sixth embodiments, text areas having an identical color are included in a single inclusive image, which is compressed by MMR. However, when separate small text areas having an identical color are included in the inclusive image, the size after compression may often increase. In this embodiment, it is checked if text areas having an identical color are to be coupled to generate an inclusive image, thus realizing more effective compression.

More specifically, the image coupling unit 2905 in FIG. 29 executes an inclusion discrimination process in addition to the processes described in the fifth and sixth embodiments. Other building components are the same as those in the fifth and sixth embodiments.

Figure 33:
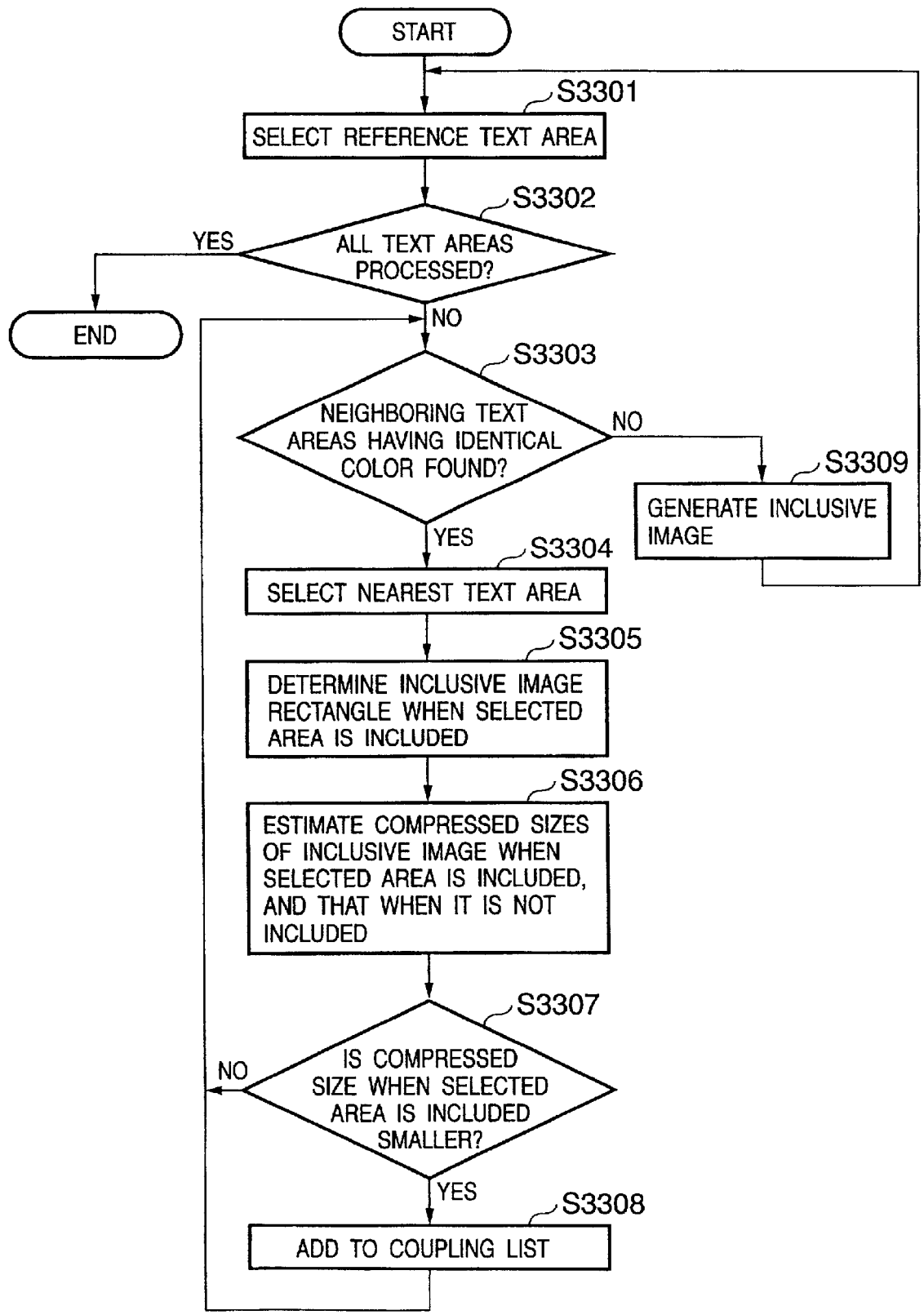
FIG. 33 is a flow chart for explaining the processing in an image coupling unit 2905 of an image processing apparatus according to the seventh embodiment of the present invention.

The processing of the image coupling unit 2905 of this embodiment will be explained below using FIG. 33. FIG. 33 is a flow chart of the detailed processing in the image coupling unit 2905 of this embodiment.

The image coupling unit 2905 selects one text area serving as a reference (to be referred to as a reference text area hereinafter) from text areas which are determined to have an identical color (step S3301). If no text area is available or if the processing is complete for all text areas (step S3302), this processing ends. On the other hand, if text areas to be processed still remain, the flow advances to step S3303.

Text areas which neighbor the reference text area and have an identical color are searched for (step S3303), and if areas which meet this condition are found, the flow advances to step S3304 to select a text area (to be referred to as a neighboring text area hereinafter) which meets the condition and is closest to the reference text area (step S3304). On the other hand, if a text area that meets the condition is not found, the flow advances to step S3309 to generate an inclusive image which includes text areas which are determined in step S3308 (to be described later) as those to be coupled to the reference text area (step S3309).

An inclusive image rectangle that includes the reference text area and neighboring text area is determined (step S3305). The total size of compressed data upon individually compressing the reference text area and neighboring text area, and the compressed size upon compressing an inclusive image are estimated (step S3306). When two areas (reference text area and neighboring text area) are individually compressed using compression ratio A of a text area which is measured in advance, their total size can be estimated by:

Compressed size 1=(area of reference text area+area of neighboring text area)×$A$+2×header size On the other hand, when an inclusive image is compressed, the two areas, i.e., the reference text area and neighboring text area included in the inclusive image always has a gap. This gap is filled with data representing a given pixel value, and can be compressed at a greatly higher compression ratio than that upon compressing a text area. If B represents this compression ratio, the size of the compressed inclusive image is given by:

Compressed size 2=(area of text area)×$A$+(area of gap)×$B$+header size

In step S3306, images may be actually compressed to obtain accurate sizes. However, when the sizes are calculated by a simple method, the processing time can be shortened.

Compressed sizes 1 and 2 are compared using the estimation results (step S3307). If it is determined that compressed size 2 is smaller than compressed size 1, i.e., if the compressed inclusive image has a smaller compressed data size than that obtained by individually compressing areas, the flow advances to step S3308 to add data indicating that the reference text area and neighboring text area are included (coupled) in a single inclusive image to a coupling list (step S3308).

FIG. 34 shows an example of the coupling list. FIG. 34 shows a configuration example of the coupling list when TEXT2 is a reference text area, and shows correspondence between TEXT2 and respective text areas TEXT1 to TEXT5. In FIG. 34, "0" is a non-coupled code, "1" is a coupled code, and "999" is an invalid code (TEXT2 cannot be coupled to itself). Initially, non-coupled codes (0 in FIG. 34) are set in all fields of the coupling list, and are changed to a coupled code (1 in FIG. 34) only when the process in step S3308 is executed.

If it is determined in step S3307 that compressed size 2 is larger than compressed size 1, i.e., if the compressed inclusive image has a larger compressed data size than that obtained by individually compressing areas, the flow returns to step S3303 to search for the next neighboring text area.

After the first loop of the aforementioned processes, when the reference text area and neighboring text area are coupled, a text area which is other than the text area selected once, has the same color as the reference text area, and is closest to the reference text area, is selected as a new neighboring text area in the next loop of the processes in step S3303 and subsequent steps (steps S3303 and S3304). An inclusive image (second inclusive image) rectangle that includes the reference text area, previous neighboring text area, and current neighboring text area is determined (step S3305), and compressed sizes 1 and 2 of the second inclusive image and current neighboring text area are estimated using the above equations (step S3306). More specifically, the following equations are used:

Compressed size 1=(area of second inclusive image+area of neighboring text area)×$A$+2×header size Compressed size 2=(area of text area)×$A$+(area of gap)×$B$+header size Then, the processes in step S3307 and subsequent steps are executed. In this manner, an inclusive image which includes a largest number of text areas and has the smallest compressed size can be generated.

(Another Embodiment)

Note that the present invention may be applied to either a part of a system constituted by a plurality of devices (e.g., a host computer, interface device, reader, printer, and the like), or a part of an apparatus consisting of a single equipment (e.g., a copying machine, facsimile apparatus, or the like).

The present invention is not limited to the apparatus and method alone for implementing the aforementioned embodiments, but the scope of the present invention includes a case wherein the above embodiments are achieved by supplying a program code of software that can implement the functions of the above-mentioned embodiments to a computer (or a CPU or MPU) in the system or apparatus, and making the computer control various devices in the system or apparatus.

In this case, the program code itself of the software implements the functions of the above-mentioned embodiments, and the program code itself, and means for supplying the program code to the computer (i.e., a storage medium which stores the program code) are included in the scope of the present invention.

As the storage medium for storing such program code, for example, a floppy disk, hard disk, optical disk, magneto-optical disk, CD-ROM, DVD, magnetic tape, nonvolatile memory card, ROM, and the like may be used.

The program code is included in the scope of the embodiments not only when the functions of the above embodiments are implemented by controlling various devices according to the supplied program code alone but also when the functions of the embodiments are implemented by collaboration of the program code and an OS (operating system) or another application software running on the computer. Furthermore, the scope of the present invention includes a case wherein the functions of the above-mentioned embodiments are implemented by some or all of actual processing operations executed by a CPU or the like arranged in a function extension board or a function extension unit, which is inserted in or connected to the computer, after the supplied program code is written in a memory of the extension board or unit.

To restate, according to the above embodiments, an image processing apparatus and method for efficiently compressing an image while maintaining high image quality, and a storage medium for implementing that method can be provided.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

extraction means for extracting a text area from multi-valued image data, and generating position data of the text area;

color computation means for generating representative color data of a text portion in the text area;

generation means for generating text image data expressed by the representative color in the text area;

conversion means for generating non-text multi-valued image data by converting multi-valued image data of the text portion using multi-valued image data of a portion other than the text portion;

first compression means for compressing the non-text multi-valued image data; and second compression means for compressing the text image data wherein said color computation means includes:

color palette generation means for generating at least one color palette as the representative color data by executing a color reduction process of a text image in the text area, and said generation means includes:

color-reduced image generation means for generating color-reduced image data corresponding to the color palette.

2. The apparatus according to claim 1, wherein said color-reduced image generation means outputs binary image data of the text area as the reduced-image data for the text area in which the number of palettes generated by said color palette generation means is 1, and generates as the reduced-image data (n+1)-valued image data (n is a natural number not less than 2) indicating correspondence between respective pixels, and color palettes or a non-text image portion for the text area in which the number of palettes generated by said color palette generation means is n.

3. The apparatus according to claim 2, wherein said second compression means uses different compression methods for the binary image data and (n+1)-valued image data.

4. The apparatus according to claim 3, wherein said second compression means executes a compression process complying with MMR compression for the binary image data, and executes compression process complying with ZIP compression for the (n+1)-valued image data.

5. The apparatus according to claim 1, wherein said first compression means executes a compression process complying with JPEG compression.

6. The apparatus according to claim 1, wherein said second compression means executes a compression process complying with MMR compression.

7. The apparatus according to claim 1, further comprising third compression means for coupling the position data, representative color data, and outputs from said first and second compression means, and compressing the coupled data by a reversible compression method.

8. The apparatus according to claim 1, further comprising reduced-image segmentation means for generating binary image data for each color palette from the reduced-image data in one text area in which a plurality of color palettes are generated, and wherein said second compression means compresses the binary image data for respective color palettes, which are generated by said reduced-image segmentation means.

9. The apparatus according to claim 1, further comprising:

reduced-image segmentation means for generating new text areas including binary text image data for respective color palettes from the reduced-image data in one text area in which a plurality of color palettes are generated; and inclusive image generation means for generating inclusive image data including a plurality of text areas having similar color palettes, and position data of the inclusive image, and wherein said second compression means compresses the inclusive image data as the text image data.

10. The apparatus according to claim 9, wherein said inclusive image generation means includes:

determination means for determining the text areas to be included in the inclusive image on the basis of compression efficiency.

11. The apparatus according to claim 10, wherein said inclusive image generation means includes:

size computation means for computing a first size obtained upon generating and compressing an inclusive image including first and second text areas, and a second size obtained upon individually compressing the first and second text areas without generating the inclusive image, and when the first size is smaller than the second size, the inclusive image including the first and second text areas is generated.

12. An image processing apparatus for expanding an image compressed by an image processing apparatus cited in claim 1, comprising:

first expansion means for expanding the non-text multi-valued image data compressed by said first compression means;

second expansion means for expanding the text image data compressed by said second compression means; and image combining means for receiving the position data and representative color data, and generating the multi-valued image data on the basis of the text image data and non-text multi-valued image data.

13. An image processing apparatus comprising:

extraction means for extracting a text area from multi-valued image data, and generating position data of the text area;

color computation means for generating representative color data of a text portion in the text area;

generation means for generating text image data expressed by the representative color in the text area;

conversion means for generating non-text multi-valued image data by converting multi-valued image data of the text portion using multi-valued image data of a portion other than the text portion;

first compression means for compressing the non-text multi-valued image data; and second compression means for compressing the text image data, wherein said generation means includes binarization means for applying a derivation filter to the multi-valued image data, computing edge amounts of pixels that form the multi-valued image with neighboring pixels, and binarizing the data on the basis of the edge amounts.

14. The apparatus according to claim 13, wherein said first compression means executes a compression process complying with JPEG compression.

15. The apparatus according to claim 13, wherein said second compression means executes a compression process complying with MMR compression.

16. The apparatus according to claim 13, further comprising third compression means for coupling the position data, representative color data, and outputs from said first and second compression means, and compressing the coupled data by a reversible compression method.

17. The apparatus according to claim 13, further comprising inclusive image generation means for generating inclusive image data including a plurality of text areas having similar representative color data, and position data of the inclusive image, and wherein said second compression means compresses the inclusive image data as the text image data.

18. The apparatus according to claim 17, wherein said inclusive image generation means includes:

determination means for determining the text areas to be included in the inclusive image on the basis of compression efficiency.

19. The apparatus according to claim 18, wherein said inclusive image generation means includes:

size computation means for computing a first size obtained upon generating and compressing an inclusive image including first and second text areas, and a second size obtained upon individually compressing the first and second text areas without generating the inclusive image, and when the first size is smaller than the second size, the inclusive image including the first and second text areas is generated.

20. An image processing apparatus for expanding an image compressed by an image processing apparatus cited in claim 13, comprising:

first expansion means for expanding the non-text multi-valued image data compressed by said first compression means;

second expansion means for expanding the text image data compressed by said second compression means; and image combining means for receiving the position data and representative color data, and generating the multi-valued image data on the basis of the text image data and non-text multi-valued image data.

21. An image processing method comprising:

an extraction step of extracting a text area from multi-valued image data, and generating position data of the text area;

a color palette generation step of generating at least one color palette by executing a color reduction process of a text image in the text area;

a generation step of generating color-reduced text image data corresponding to the color palette;

a conversion step of generating non-text multi-valued image data by converting multi-valued image data of the text portion using multi-valued image data of a portion other than the text portion;

a first compression step of compressing the non-text multi-valued image data; and a second compression step of compressing the text image data.

22. An image processing method comprising:

an extraction step of extracting a text area from multi-valued image data, and generating position data of the text area;

a color computation step of generating representative text color data of a text portion for each text area;

a generation step of generating text image data;

a conversion step of generating non-text multi-valued image data by converting multi-valued image data of the text portion using multi-valued image data of a portion other than the text portion;

a first compression step of compressing the non-text multi-valued image data; and a second compression step of compressing the text image data.

wherein said generation step includes binarization step of applying a derivation filter to the multi-valued image data, computing edge amounts of pixels that form the multi-valued image with neighboring pixels, and binarizing the data on the basis of the edge amounts.

23. A computer readable memory that stores a compression program for compressing multi-valued image data, said compression program comprising:

a code of an extraction step of extracting a text area from multi-valued image data, and generating position data of the text area;

a code of a color palette generation step of generating at least one color palette by executing a color reduction process of a text image in the text area;

a code of a generation step of generating color-reduced text image data corresponding to the color palette;

a code of a conversion step of generating non-text multi-valued image data by converting multi-valued image data of the text portion using multi-valued image data of a portion other than the text portion;

a code of a first compression step of compressing the non-text multi-valued image data; and a code of a second compression step of compressing the text image data.

24. A computer readable memory that stores a compression program for compressing multi-valued image data, said compression program comprising:

a code of an extraction step of extracting a text area from multi-valued image data, and generating position data of the text area;

a code of a color computation step of generating representative text color data of a text portion for each text area;

a code of a generation step of generating text image data;

a code of a conversion step of generating non-text multi-valued image data by converting multi-valued image data of the text portion using multi-valued image data of a portion other than the text portion;

a code of a first compression step of compressing the non-text multi-valued image data; and a code of a second compression step of compressing the text image data.

wherein said generation step includes binarization step of applying a differential filter to the multi-valued image data, computing edge amounts of pixels that form the multi-valued image with neighboring pixels, and binarizing the data on the basis of the edge amounts.

* * * * *

UNITED STATES PATENT AND TRADEMARK OFFICE
CERTIFICATE OF CORRECTION

PATENT NO. : 7,133,565 B2
APPLICATION NO. : 09/931890
DATED : November 7, 2006
INVENTOR(S) : Yukari Toda et al.

It is certified that error appears in the above-identified patent and that said Letters Patent is hereby corrected as shown below:

COLUMN 12

Line 34, "that" should read --what--.

COLUMN 22

Line 2, "data" should read --data,--;
　　　Line 21, "data" should read --data,--;"is" should read --being--; and "2)" should read --2),--.

COLUMN 23

Line 18, "cited" should read --claimed--.

COLUMN 24

Line 22, "cited" should read --claimed--;
　　　Line 36, "step" should read --step,--;
　　　Line 39, "step" should read --step,--;
　　　Line 42, "step" should read --step,--;
　　　Line 44, "step" should read --step,--;
　　　Line 48, "step" should read --step,--;
　　　Line 50, "step" should read --step,--;
　　　Line 53, "step" should read --step,--;
　　　Line 56, "step" should read --step,--;
　　　Line 59, "step" should read --step,--;
　　　Line 60, "step" should read --step,--;
　　　Line 64, "step" should read --step,--; and
　　　Line 66, "step" should read --step,--.

COLUMN 25

Line 1, "step" should read --step,--;
　　　Line 9, "step" should read --step,--;
　　　Line 12, "step" should read --step,--;
　　　Line 15, "step" should read --step,--;
　　　Line 17, "step" should read --step,--;
　　　Line 22, "step" should read --step,--; and
　　　Line 24, "step" should read --step,--.

UNITED STATES PATENT AND TRADEMARK OFFICE
CERTIFICATE OF CORRECTION

PATENT NO. : 7,133,565 B2
APPLICATION NO. : 09/931890
DATED : November 7, 2006
INVENTOR(S) : Yukari Toda et al.

It is certified that error appears in the above-identified patent and that said Letters Patent is hereby corrected as shown below:

<u>COLUMN 26</u>

Line 4, "step" should read --step,--;
    Line 7, "step" should read --step,--;
    Line 10, "step" should read --step,--;
    Line 11, "step" should read --step,--;
    Line 15, "step" should read --step,--;
    Line 17, "step" should read --step,--;
    Line 18, "data." should read --data,--;
    Line 19, "includes" should read --includes a--; and "step" should read --step,--.

Signed and Sealed this

Nineteenth Day of June, 2007

JON W. DUDAS
*Director of the United States Patent and Trademark Office*